(12) United States Patent
Notani

(10) Patent No.: US 6,870,877 B2
(45) Date of Patent: Mar. 22, 2005

(54) TRANSMISSION UNIT AND TWO-WAY SIGNAL CONVERSION METHOD

(75) Inventor: Morihito Notani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 740 days.

(21) Appl. No.: 09/752,350

(22) Filed: Dec. 29, 2000

(65) Prior Publication Data

US 2001/0021171 A1 Sep. 13, 2001

(30) Foreign Application Priority Data

Mar. 7, 2000 (JP) ........................................ 2000-067134

(51) Int. Cl.⁷ .............................. H04B 1/38; H04L 5/16
(52) U.S. Cl. .................................. 375/221; 370/395.51
(58) Field of Search ................................ 375/221, 220; 370/466, 907, 539

(56) References Cited

U.S. PATENT DOCUMENTS

| | | | | |
|---|---|---|---|---|
| 5,315,594 A | * | 5/1994 | Noser | 370/353 |
| 5,506,847 A | * | 4/1996 | Shobatake | 370/338 |
| 6,011,802 A | * | 1/2000 | Norman | 370/466 |
| 6,477,178 B1 | * | 11/2002 | Wakim et al. | 370/466 |
| 6,603,776 B1 | * | 8/2003 | Fedders et al. | 370/476 |
| 6,690,674 B1 | * | 2/2004 | Christie et al. | 370/401 |

FOREIGN PATENT DOCUMENTS

| | | |
|---|---|---|
| JP | 59194594 | 11/1984 |
| JP | 05327642 | 12/1993 |
| JP | 07154357 | 6/1995 |
| JP | 10243008 | 9/1998 |

OTHER PUBLICATIONS

Internationl Gateway For SDH and SONET Interconnection; IEEE 1994 ; 078031820-x/94.*
K. Rao et al., "SDH—Sonet Interworking", Interworking In Broadband Networks, Heterogeneity And Global Networking, Proceedings of Interworking, □□1993, pp. 290–304.*

* cited by examiner

Primary Examiner—Stephen Chin
Assistant Examiner—Harry Vartanian
(74) Attorney, Agent, or Firm—Katten Muchin Zavis Rosenman

(57) ABSTRACT

A transmission unit which transports digital signals between different network systems, effectively converting the signals to resolve their differences in the specifications. A first signal interface transmits and receives first network signals. A second signal interface transmits and receives second network signals. A downward converter produces lower-level signals by converting received first and second network signals to a lower hierarchical level at which the first and second network systems are compatible with each other in terms of logical signal structure. An upward converter produces a higher-level signal by converting each given lower-level signal to an upper hierarchical level which complies with the first or second network system. A loopback unit provides loopback paths to route the lower-level signals from the downward converter to the upward converter, so that the first and second network signal will be converted in both directions.

24 Claims, 28 Drawing Sheets

STM-4 FRAME OVERHEAD FORMAT USED INSIDE THE UNIT

| #1 | #2 | #3 | #12 | #1 | #2 | #3 | #12 | #1 | #2 | #3 | #12 |
|----|----|----|-----|----|----|----|-----|----|----|----|-----|
| A1 | A1 | A1 | A1  | A2 | A2 | A2 | A2  | —  | —  | —  | —   |
| B1 | —  | —  | —   | E1 | —  | —  | —   | —  | —  | —  | —   |
| —  | —  | —  | —   | —  | —  | —  | —   | —  | —  | —  | —   |
| H1 | H1 | H1 | H1  | H2 | H2 | H2 | H2  | H3 | H3 | H3 | H3  |
| —  | —  | —  | —   | —  | —  | —  | —   | —  | —  | —  | —   |
| —  | —  | —  | —   | —  | —  | —  | —   | —  | —  | —  | —   |
| —  | —  | —  | —   | —  | —  | —  | —   | —  | —  | —  | —   |
| —  | —  | —  | —   | —  | —  | —  | —   | —  | —  | —  | —   |
| —  | —  | —  | —   | —  | —  | —  | —   | —  | —  | —  | —   |

| — | : ALL 0 |

FIG. 19

| BIT# | DEFINITION | STATE |
|---|---|---|
| 1, 2 | UNUSED | 0 |
| 3 | AU-4-16c (STS-48c) | 1: CONCATENATED |
| 4 | AU-4-4c (STS-12c) | 1: CONCATENATED |
| 5 | AU-4(STS-3c) #4 | 1: CONCATENATED |
| 6 | AU-4(STS-3c) #3 | 1: CONCATENATED |
| 7 | AU-4(STS-3c) #2 | 1: CONCATENATED |
| 8 | AU-4(STS-3c) #1 | 1: CONCATENATED |

FIG. 20

TRANSMISSION UNIT AND TWO-WAY SIGNAL CONVERSION METHOD

BACKGROUND OF THE INVENTION

1. Field of the Invention

The present invention relates to a transmission unit and a two-way signal conversion method. More particularly, the present invention relates to a transmission unit which transports digital signals, and to a method to convert signal formats, transmission rates, hierarchical levels, and other attributes in both directions.

2. Description of the Related Art

Synchronous Digital Hierarchy (SDH) and Synchronous Optical Network (SONET) specifications have been standardized and implemented as today's core data multiplexing technologies which provide an efficient way of integrating a wide variety of high-speed and low-speed services. Digital signals that this type of synchronous networks carry are organized in accordance with prescribed hierarchical multiplexing levels, where lower-order group signals (i.e., slower signals) are combined into a higher-order signal (i.e., faster signal). Each network element accepts such higher-order multiplexed signals form the upstream element and retransmits them the downstream element, while extracting and inserting some lower-order group signals. Some nodes with cross-connect capabilities provide consolidation and segregation of transport signals.

As an approach for improved maintainability of the above transport systems, a signal loopback technique is disclosed in the Japanese Unexamined Patent Publication No. 10-243008 (1998). According to the disclosed technique, the signal in any specified time slot of a low-order group channel is looped back to another low-order group channel. This conventional technique, however, is limited to low-order group signals of the same hierarchical series of multiplexing levels, and it is therefore not possible to loop back a signal from one channel to a different type of channel, such as from a high-order SONET channel to a high-order SDH channel. That is, conventional systems do not support looping back between networks having different signal specifications. For operations and maintenance of various telecommunication services on a global scale, it is necessary to develop an improved transport system which supports efficiently converting, not only between SONET and SDH, but other signals having different specifications to one another.

SUMMARY OF THE INVENTION

Taking the above into consideration, an object of the present invention is to provide a transmission unit which transmits and receives signals between network systems, effectively converting signals to resolve the difference in their specifications.

It is another object of the present invention to provide a two-way signal conversion method which converts network-specific transport signals effectively.

To accomplish the first object stated above, according to the present invention, there is provided a transmission unit which transmits and receives digital signals over a first and second network systems. This transmission unit comprises a first signal interface, a second signal interface, and a two-way signal converter. The first signal interface transmits and receives first network signals, while the second signal interface transmits and receives the second network signals. The two-way signal converter converts between the first network signals and the second network signals. To this end, the two-way signal converter comprises a downward converter, an upward converter, and a loopback unit. The downward converter converts the received first and second network signals down to a lower hierarchical level at which the first and second network systems are compatible with each other in terms of logical signal structure, thereby producing lower-level signals. The upward converter, on the other hand, converts each given lower-level signal up to a higher hierarchical level which complies with the first or second network system, thereby producing higher-level signals. The looping back unit interconnects the downward and upward converters at the lower hierarchical level. That is, it loops back the produced lower-level signals to the upward converter, thereby causing the received first and second network signals to be converted into a second and first outgoing network signals, respectively. These first and second outgoing network signals are sent out to the first and second network systems through the first and second interfaces, respectively.

To accomplish the second object, according to the present invention, there is provided a two-way signal conversion method which converts network signals between a first and second network systems. This method comprises the following three steps. At step (a), lower-level signals are produced by converting a first and second incoming network signals down to a certain lower hierarchical level at which the first and second network systems are compatible with each other in terms of logical signal structure. At step (b), higher-level signals are produced by converting each given lower-level signal up to a higher hierarchical level which complies with the first or second network system. At step (c), loopback paths are provided, so that the lower-level signals produced at step (a) will be subjected to the step (b). This enables the lower-level signal resulting from the first incoming network signal to be converted into an outgoing signal to the second network system. Also, the lower-level signal resulting from the second incoming network signal is converted into an outgoing signal to the first network system.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 19 shows the location of E1 byte in an overhead;

FIG. 20 shows the details of E1 byte usage;

DESCRIPTION OF THE PREFERRED EMBODIMENTS

Preferred embodiments of the present invention will be described below with reference to the accompanying drawings.

Figure 1:
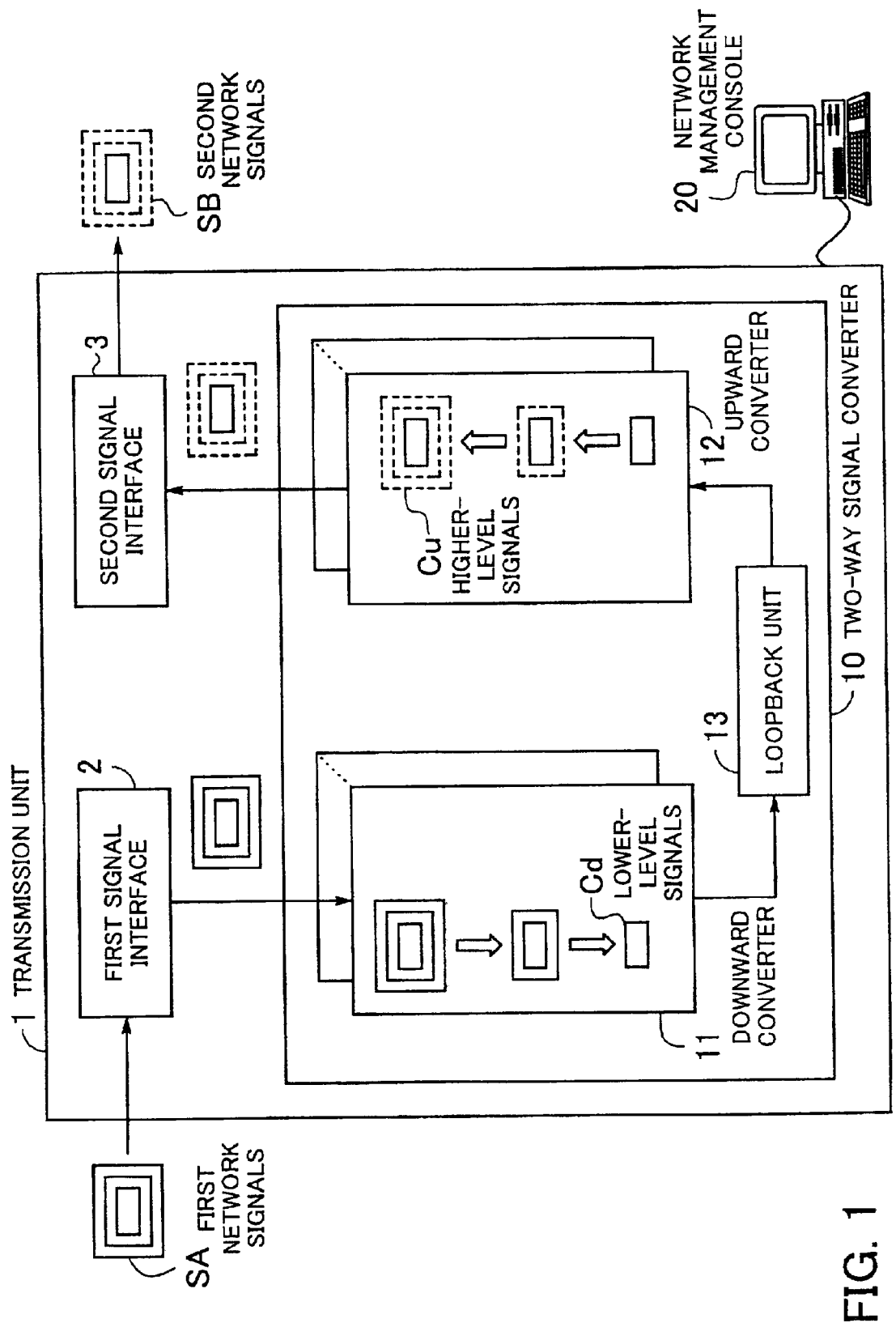
FIG. 1 is a conceptual view of a transmission unit according to the present invention.

FIG. 1 is a conceptual view of a transmission unit according to the present invention. This transmission unit 1 receives a signal SA of a first network system and converts it into a signal SB of a second network system. The transmission unit 1 also receives a signal SB of the first network system and converts it into a signal SA of the first network system. Those transport signals SA and SB are structured in multiple levels according to their respective protocol specifications, as indicated by the nested rectangles in FIG. 1. As a result, they are partly incompatible with each other in terms of higher-level structure, as in the case of SONET and SDH. The transmission unit 1 converts those signals in both directions simultaneously, although FIG. 1 only shows a one-way conversion, from the first network signal SA to the second network signal SB, for the sake of simplicity.

The transmission unit 1 comprises a first signal interface 2, a second signal interface 3, and a two-way signal converter 10. The first signal interface 2 transmits and receives first network signals SA. The two-way signal converter 10 comprises a downward converter 11 and an upward converter 12 and a loopback unit 13. The transmission unit 1 actually employs multiple sets of these converter elements 11 and 12, as will be explained later in FIG. 2.

The downward converter 11 produces a lower-level signal Cd by converting the received first network signal SA to a lower hierarchical level at which the first and second network systems are compatible with each other in terms of logical signal structure. The upward converter 12, on the other hand, produces a higher-level signal Cu by converting the lower-level signal Cd to an upper hierarchical level which complies with the second network signal specifications. The loopback unit 13 provides a loopback path of the down-converted signal Cd from the downward converter 11 to the upward converter 12, so that the first network signal SA will be converted into a signal compatible with the second network system. The second signal interface 3 transmits and receives second network signals SB. FIG. 1 shows that the second signal interface 3 aligns the higher-level signal Cu into an outgoing second network signal SB.

It should be noted again that the transmission unit 1 has another set of downward converter 11 and upward converter 12 to convert transport signals in the other direction, from the second network signal SB to the first network signal SA. The additional downward converter 11, in this case is coupled to the second signal interface 3, and the additional upward converter 12 is linked to the first signal interface 2. The loopback unit 13 provides a path from the downward converter 11 to the upward converter 12 so as to loop back a lower-level signal Cd deriving from a received second network signal SB.

The transmission unit 1 operates with a network management console 20. This network management console 20 is used for operations and maintenance of the transmission unit 1, including configuration management for the above-described signal conversion functions.

Figure 2:
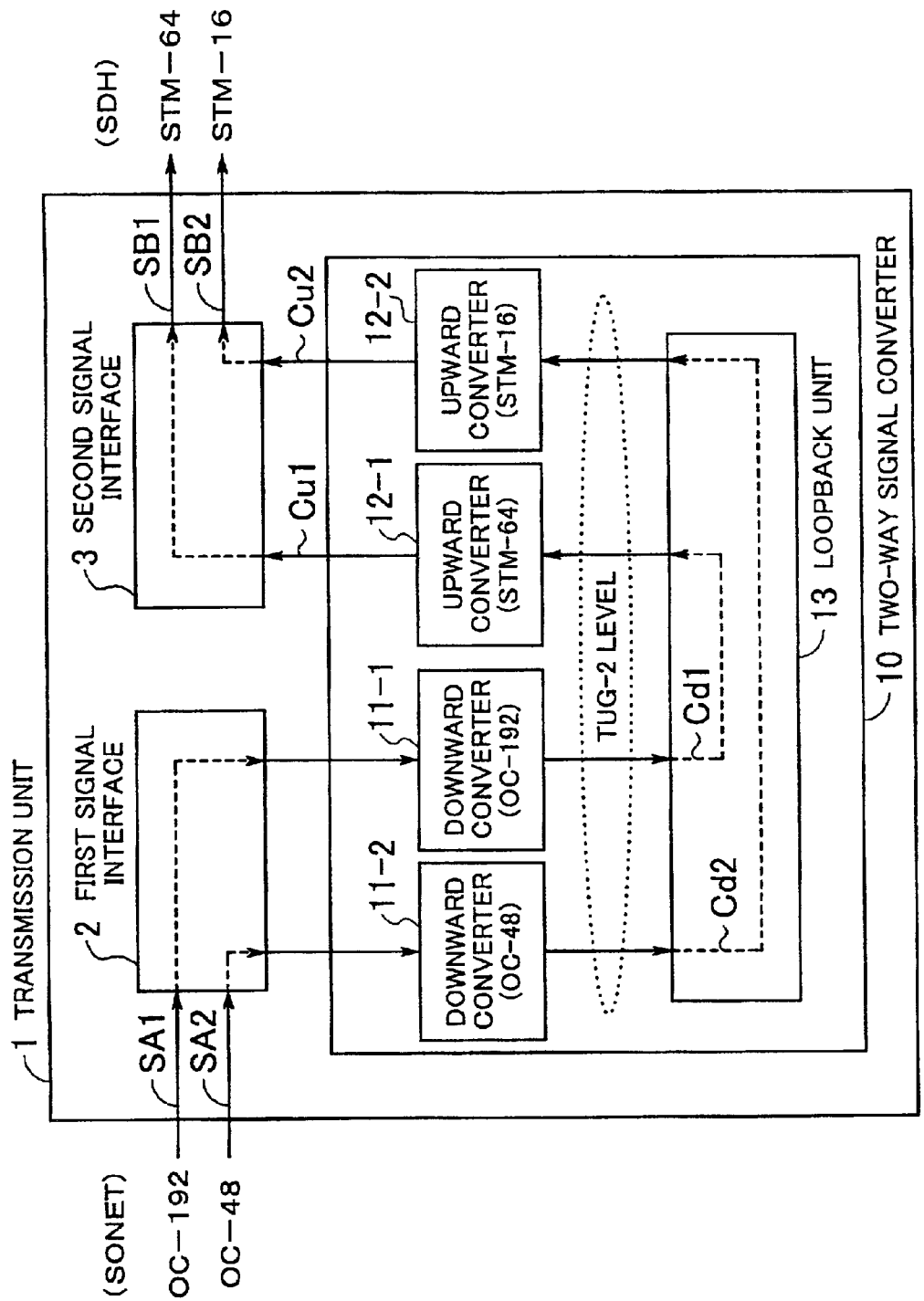
FIG. 2 shows the operation of the proposed transmission unit.

Referring next to FIG. 2, the operation of the transmission unit 1 will be briefly described. The illustrated transmission unit 1 is configured to convert a SONET OC-192 signal with the transmission rate of 9.953280 Gbps to an SDH Synchronous Transfer Module Level 64 (STM-64) signal with the same rate. The transmission unit 1 also converts a SONET OC-48 signal with the rate of 2.488320 Gbps to an SDH STM-16 signal with the same rate. The two-way signal converter 10 thus comprises two downward converters 11-1 and 11-2 and two upward converters 12-1 and 12-2 to process two different signals concurrently. The first signal interface 2 receives an OC-192 signal SA1 and supplies it to one downward converter 11-1. The first signal interface 2 also receives an OC-48 signal SA2 and supplies it to the other downward converter 11-2.

The downward converter 11-1 converts the received signal SA1 down to the Tributary Unit Group-2 (TUG-2) level (6.912 Mbps) or lower. At this TUG-2 level, the SONET and SDH specifications are compatible with each other, allowing data to be passed from the OC-192 channel to the STM-64 channel. The downward converter 11-2, on the other hand, converts the received signal SA2 down to TUG-2 level (6.912 Mbps) or lower, at which the data can be passed from the OC-48 channel to the STM-16 channel. In this way, the two downward converters 11-1 and 11-2 produce lower-level signals Cd1 and Cd2 at TUG-2 level.

The loopback unit 13 provides loopback paths to route one TUG-2 level signal Cd1 from the downward converter 11-1 to the upward converter 12-1 for conversion to STM-64 rate, as well as to feed the other TUG-2 signal Cd2 from the downward converter 11-2 to the upward converter 12-2 for conversion to STM-16 rate.

The upward converter 12-1 converts the given TUG-2 signal Cd1 up to STM-64 level, thus producing an upper level signal Cu1. Likewise, the other upward converter 12-2 converts the other TUG-2 signal Cd2 up to STM-16 level, thus producing another upper level signal Cu2. The second signal interface 3 sends out those upper level signals Cu1 and Cu2 as higher-level SDH signals SB1 (STM-64) and SB2 (STM-16), respectively.

Although the above section has discussed the conversion from SONET to SDH, it should be noted that the transmission unit 1 has another set of downward and upward converters to provide an SDH-to-SONET bridge. In this case, the downward converter breaks down a higher-level SDH signal into lower-level signals, and the upward converter multiplexes given lower-level signals into a higher-level SONET signal.

The above explanation has assumed that the first network signals SA are fed directly from the first signal interface 2 to the downward converter 11, and the upper level signals Cu are fed directly from the upward converter 12 to the second signal interface 3. As will be described later in FIG. 3, those signals may be converted to an adequate rate that is suitable for the internal operations and processing in the transmission unit 1.

Further, while the above-described transmission unit 1 converts between high-order group signals, the invention should not be limited to any specific group of signals, but can handle low-order group signals as well. The first signal interface 2 may receive lower order SONET signals, such as OC-3 (155.2 Mbps) or STS-12, and subject them to appropriate internal functions in the transmission unit 1 to yield STM-1 or STM-4 signals. The resultant SDH signals are then output through the second signal interface 3.

Figure 3:
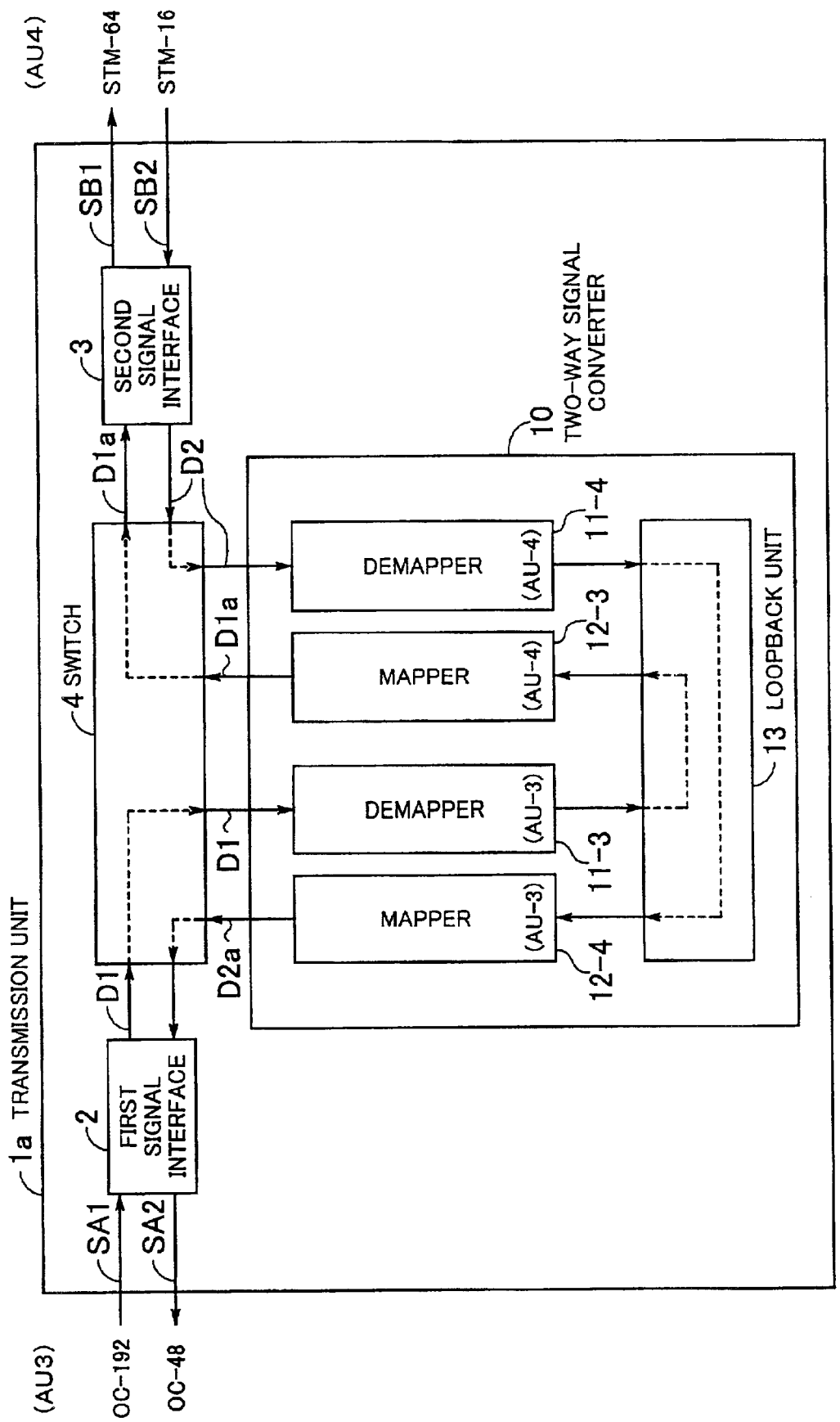
FIG. 3 is a block diagram of a transmission unit.

Referring next to a block diagram of FIG. 3, another type of transmission unit which processes transport signals after making them adapt to its internal interface specifications. Illustrated in FIG. 3 is a transmission unit 1a which converts AU-3 signals to AU-4 signals, or vise versa. Administrative Unit Level 3 (AU-3) is a signal form commonly used in SONET transport systems, while AU-4 is often seen in SDH transport systems. Note that, in the following explanation, the terms "mapping" and "demapping" will be used to refer to what have been described so far as the upward conversion and downward conversion, respectively. Accordingly, the upward and downward converters will be called "mappers" and "demappers."

The illustrated transmission unit 1a converts a SONET OC-192 signal SA1 to an SDH STM-64 signal SB1 as follows. The first signal interface 2 receives an OC-192 signal SA1 (9.953280 Gbps) and converts it into internal signals D1 with a certain bit rate, which is, for example, STS-12 signals with the rate of 622.080 Mbps. In this way, the transmission unit 1a processes a high-rate transport signal after down-converting them to lower rate signals.

Unlike the transmission unit 1 described earlier in FIG. 2, the transmission unit 1a comprises a switch 4. With its signal path selecting function, this switch 4 directs the internal signals D1 to an AU-3 demapper 11-3 which converts D1 down to the TUG-2 level or lower.

The loopback unit 13 provides a loopback path from the demapper 11-3 to a mapper 12-3. The mapper 12-3 makes a mapping from TUG-2 level to AU-4 level, thereby producing remapped internal signals D1a. The signals D1a are STM-4 signals with the rate of 622.080 Mbps. The switch 4 directs the remapped internal signals D1a to the second signal interface 3. The second signal interface 3 multiplexes the remapped internal signals D1a up to the STM-64 level and outputs the resultant signal as an STM-64 signal SB1.

The illustrated transmission unit 1a also converts an SDH STM-16 signal SB2 to a SONET OC-48 signal SA2 as follows. The second signal interface 3 receives an STM-16 signal SB2 and converts it into internal signals D2 with the STM-4 rate of 622.080 Mbps. With its signal path selecting function, the switch 4 directs the internal signals D2 to an AU-4 demapper 11-4. The demapper 11-4 further breaks down the internal signals D2 to TUG-2 level or lower. The loopback unit 13 provides a loopback path from the demapper 11-4 to a mapper 12-4. The mapper 12-4 makes a mapping from TUG-2 level to AU-3 level, thereby producing remapped internal signals D2a. These signals D2a are STS-12 signals with the rate of 622.080 Mbps. The switch 4 directs the remapped internal signals D2a to the first signal interface 2. The first signal interface 2 multiplexes the remapped internal signals D2a to OC-48 level and outputs the resultant signal as an OC-48 signal SA2.

Referring again to FIG. 1, the proposed transmission unit 1 terminates and adds a frame overhead when converting transport signals. More specifically, the demapper (or downward converter) 11 in the integral two-way signal converter 10 terminates the overhead information of each received frame when demapping SONET or SDH signals. Such information includes: Section Overhead (SOH), Path Overhead (POH), AU pointer, and Tributary Unit (TU) pointer. The resultant lower-level signals are looped back to an appropriate mapper (or upward converter) 12 through the loopback unit 13. During it upward conversion process, the mapper 12 adds an SOH and POH to those signals, thereby raising them to an upper hierarchical level.

The function of terminating and adding overhead information need not necessarily be concentrated in the two-way signal converter 10. Rather, this function may be implemented in the switch 4, first signal interface 2, and second signal interface 3 in a distributed manner. For example, the following scenario would be possible when converting first network signals into second network signals: The first signal interface 2 terminates SOH, the switch 4 removes pointers, and then the demapper 11 terminates POH. After that, the signal is looped back to the mapper 12, where POH is added. The switch 4 then inserts pointer information, and the second signal interface 3 adds SOH.

Figure 4:
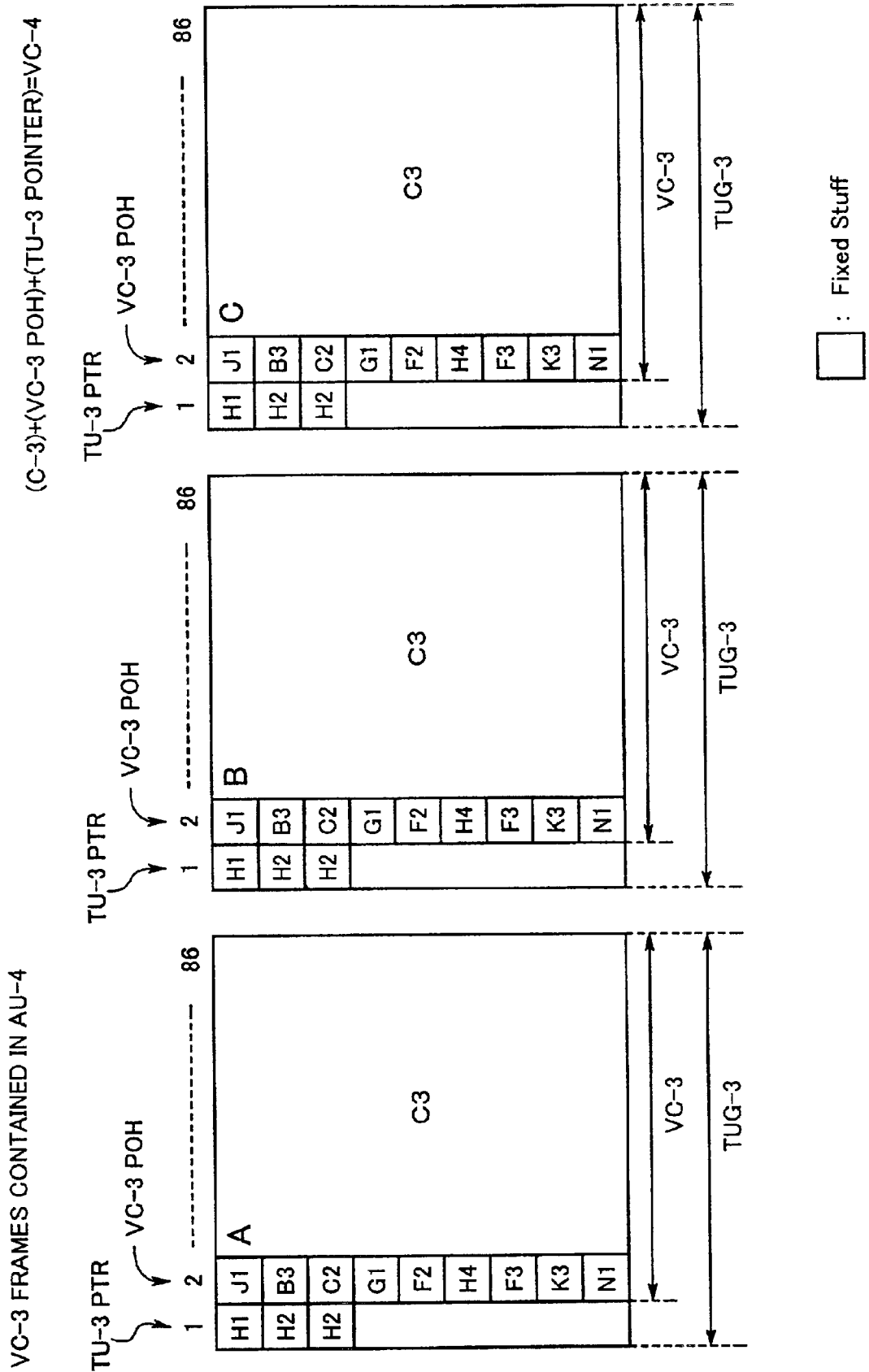
FIGS. 4 to 6 show the location of stuff columns.
Figure 5:
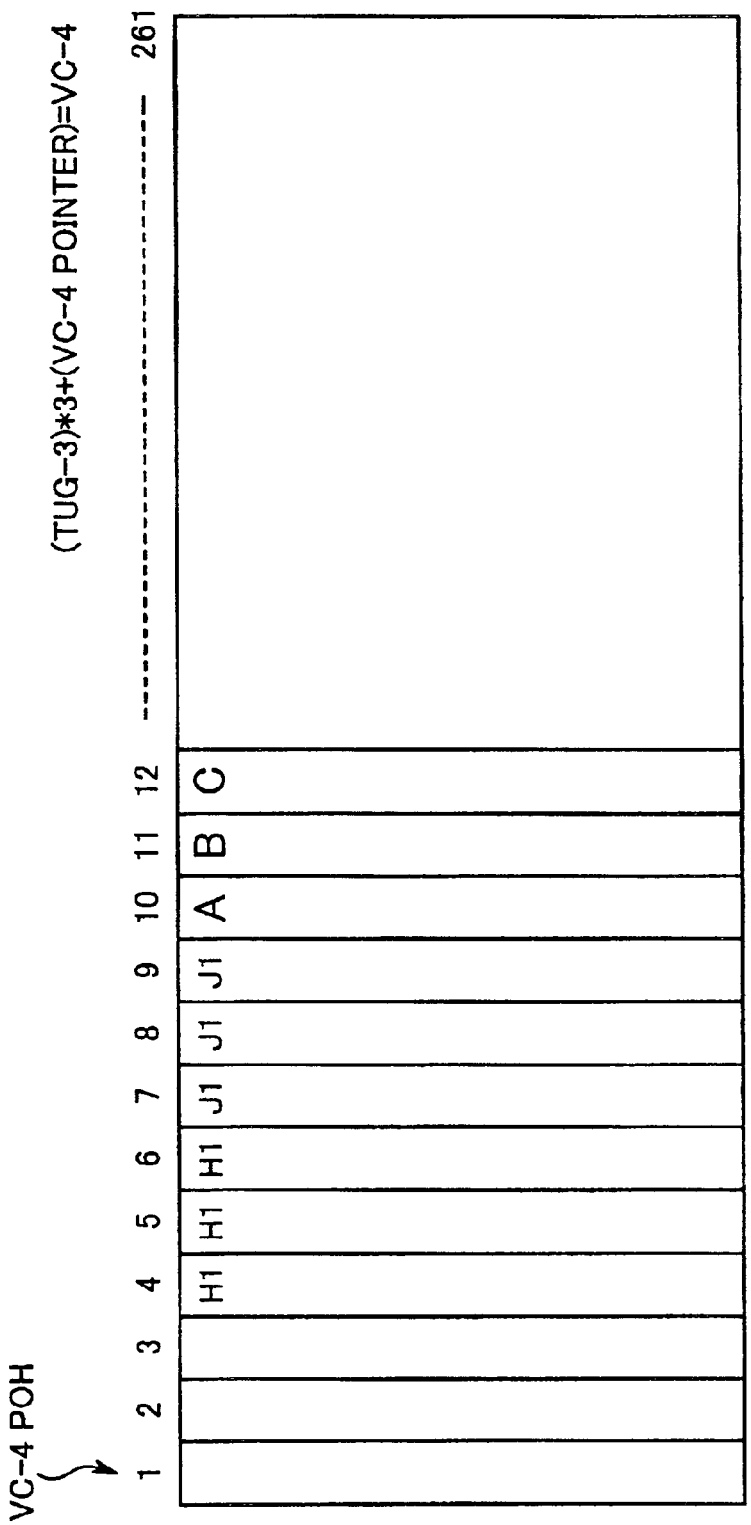
Figure 6:
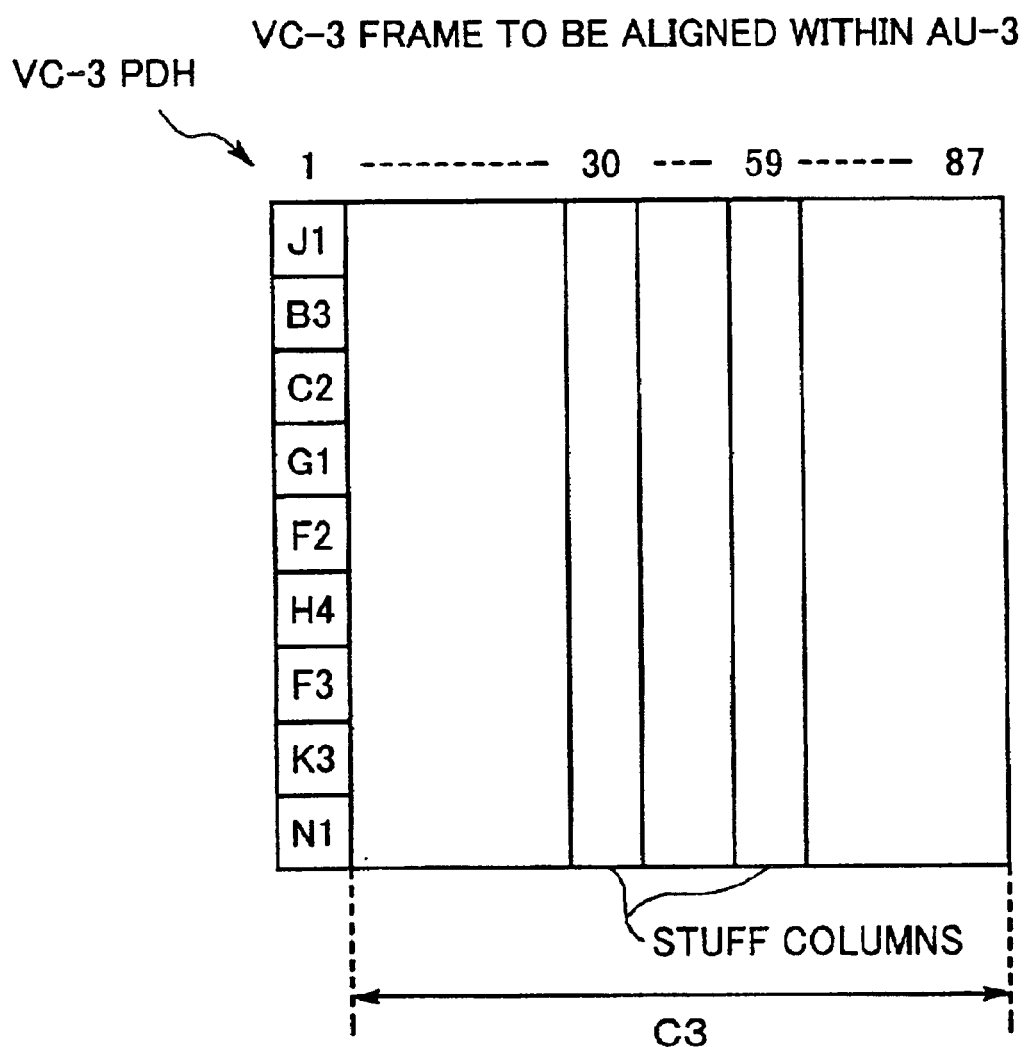

To handle VC-3 signals, the locations of fixed stuff, the bytes carrying no overhead or payload, should be considered. FIGS. 4 to 6 show such fixed stuff locations of VC-3 and other related frames. The location of stuff columns within a frame depends on which hierarchical series of multiplexing levels the frame belong to, as described below.

According to the standard SDH multiplexing hierarchy, a Synchronous Transfer Module Level-1 (STM-1) signal carries a single AU-4 frame. An AU-4 frame contains a single VC-4 frame in which three VC-3 frames are multiplexed. The SDH standards also define another type of STM-1 signal which is composed of three AU-3 frames each containing a single VC-3 frame. That is, VC-3 appears at two nodes in the hierarchical tree of standard SDH multiplexing levels. FIG. 4 shows such VC-3 frames as the lower-level components of AU-4, and FIG. 5 depicts a VC-4 frame containing VC-3 frames of this type. FIG. 6, on the other hand, shows a VC-3 frame as the component of AU-3.

The STM-1 payload is 261 columns in length, regardless of whether it is organized by a single AU-4 frame (i.e., single VC-4 frame) or three AU-3 frames (i.e., three VC-3 frames). In the both cases, 252 columns out of 261 columns are used to carry the user information at the intended bitrate, and the remaining six columns are used for other purposes or filled with stuff bytes. More specifically, in the case of AU-3 (FIG. 6), two columns #30 and #59 of each of three VC-3 frames are defined as fixed stuff, making six stuff columns in total. In the case of AU-4 (FIGS. 4 and 5), the six remaining columns are assigned to VC-4 POH, two fixed stuff columns #2 and #3 in VC-4 frame, and three TU-3 pointers (one for each VC-3 frame).

As seen from the above, the VC-3 frame format for AU-4 is not compatible with that for AU-3 in terms of the arrangement of stuff columns. This is why the two-way signal converter 10 has to consider the stuff column locations when converting transport signals. Take an AU-4 to AU-3 conversion, for example. The demapper 11 converts a given AU-4 signal down to a particular hierarchical level at which no stuff bytes are seen, the resulting signal being looped back to the mapper 12. The mapper 12 inserts an appropriate number of stuff bytes (i.e., stuff columns #30 and #59 of each VC-3 frame) to the given signal, thus mapping it to a higher-level signal.

Figure 7:
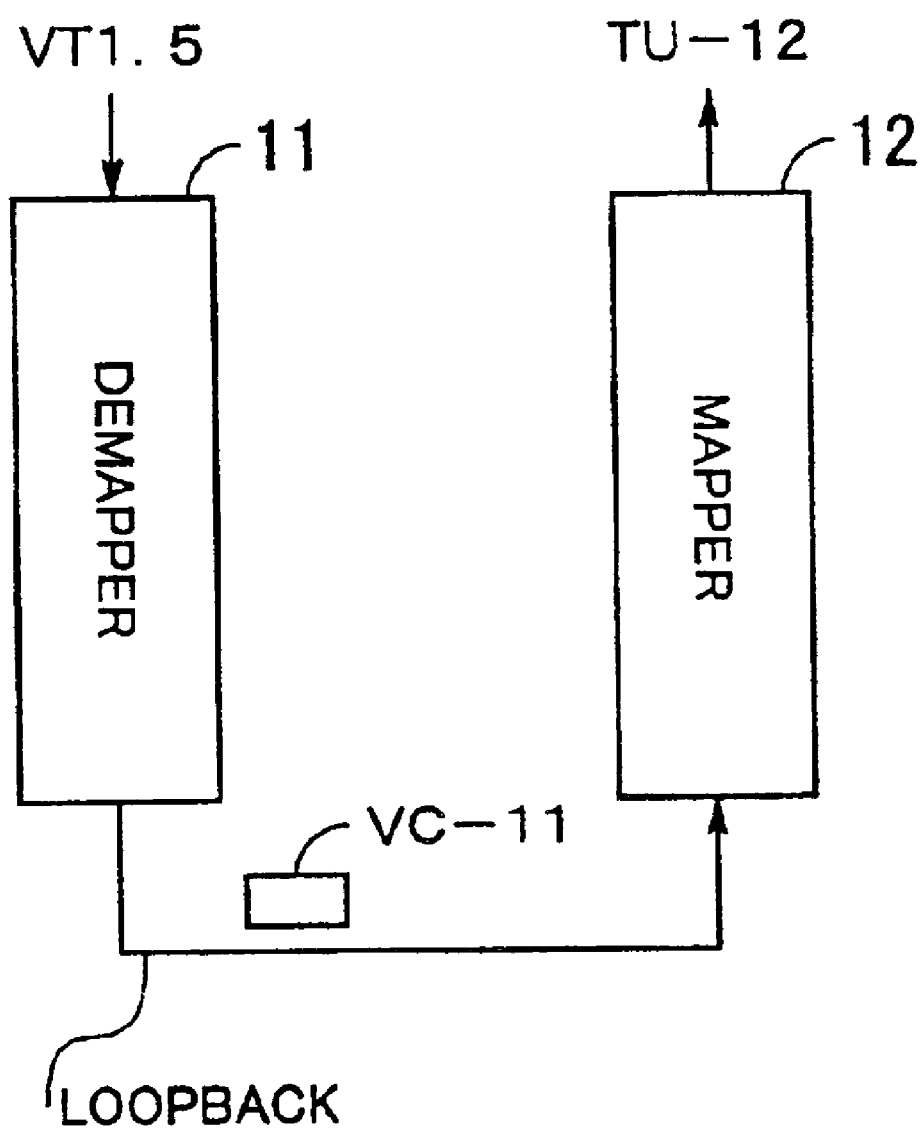
FIG. 7 depicts a conversion from VT-1.5 to TU-12.

Besides processing transport signals with the same rate as described above, the proposed two-way signal converter 10 can also converts signals with different rates. More specifically, FIG. 7 shows a conversion from SONET Virtual Tributaries 2(VT-1.5) signals (1.5 Mbps) to SDH TU-12 signals (2 Mbps). The primary rate interface service in SONET networks operates typically at 1.5 Mbps. In SDH networks, on the other hand, the rate of 2 Mbps is commonly used. Each single transport signal at VC-3 or equivalent level is capable of carrying up to twenty-eight VT-1.5 channels, or up to twenty-one TU-12 channels.

Referring to FIG. 7, the demapper 11 makes a demapping of 1.5 Mbps data out of the incoming SONET VT-1.5 signal to yield a SDH VC-11 signal. This VC-11 signal is looped back to the mapper 12, which converts the signal up to the TU-12 level operating at 2 Mbps. In this way, VT-1.5 signals can be translated into TU-12 signals. From the above discussion, it would be appreciated that the same method applies to other similar rate conversions, such as TU-11 to TU-12 and TU-11 to VT-2.

Figure 8:
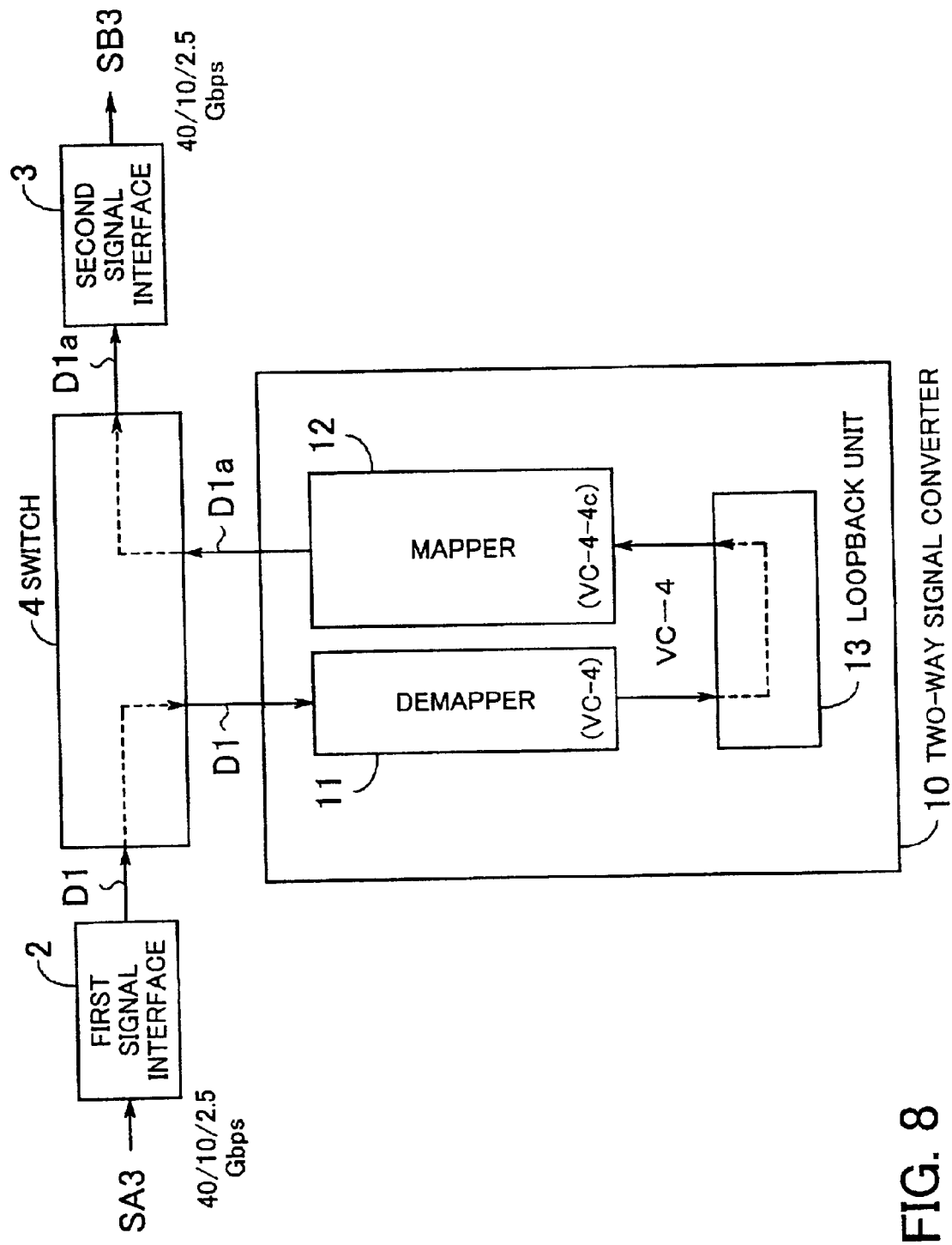
FIG. 8 depicts a conversion from a high-order signal in which VC-4 signals are multiplexed to another high-order signal in which VC-4-4c signals are multiplexed.

The proposed two-way signal converter 10 may also be configured to translate one signal to a different signal level within the same hierarchical series, such as from a high-rate signal carrying VC-4 virtual containers to that conveying VC-4-4c concatenated containers. FIG. 8 depicts this type of conversion. The first signal interface 2 receives an incoming signal SA3 with a transmission rate of 40 Gbps, 10 Gbps, or 2.5 Gbps on which VC-4 virtual containers are multiplexed. It converts the received signal into internal signals D1 with a certain bitrate, e.g., STM-16 or STM-4 rate. With its signal path selecting function, the switch 4 directs the internal signals D1 to the demapper 11. The demapper 11 demaps the received internal signals D1 down to the VC-4 level or lower. The loopback unit 13 provides a loopback path from the demapper 11 to the mapper 12. The mapper 12 maps the given VC-4 signals to the VC-4-4c level, thereby producing remapped internal signals D1a with the STM-16 or STM-4 rate. The switch 4 routes the remapped internal signals D1a to the second signal interface 3. The second signal interface 3 converts those signals D1a to VC-4-4c concatenated channel signals with a rate of 40, 10, or 2.5 Gbps. In this way, the first network signals SA3 is converted to the second network signals SB3. It would be appreciated that the same method applies to the conversion in the opposite direction, as well as to other similar conversions, such as from VC-4-16c multiplexed signals to VC-3 multiplexed signals.

According to the present invention, the two-way signal converter 10 may also be configured to convert Plesiochronous Digital Hierarchy (PDH) frames. PDH systems provide various types of frames at each multiplexing level. Digital Signal Level-3 (DS3) lines operating at 44.736 Mbps, for example, carry M13, M23, and C-bit frames. Likewise, 1.544-Mbps DS1 lines convey SF, ESF, and SLC-96 frames, and 34.368-Mbps E3 lines carry the frames defined in the ITU-T recommendations G.751 and G.832. The present invention enables these different PDH frames to be converted to each other.

Figure 9:
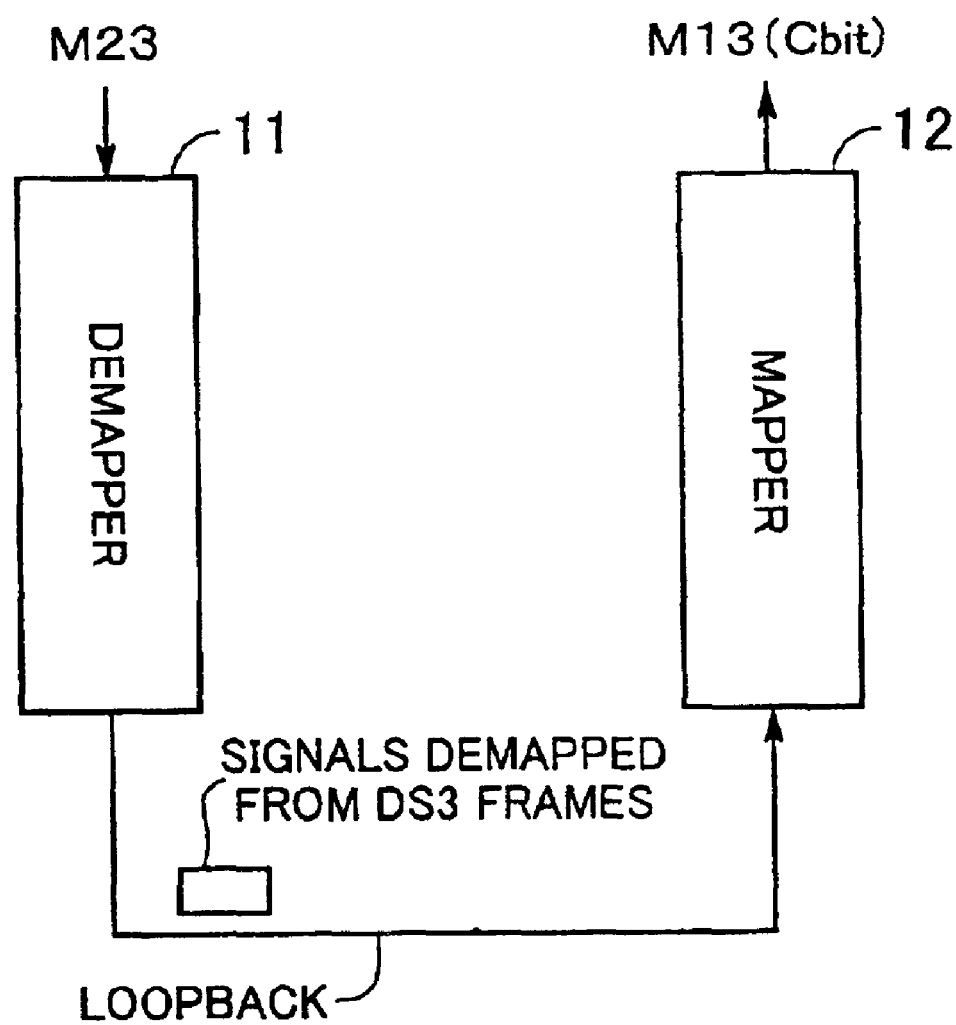
FIG. 9 depicts a conversion from M23 to M13 (or C-bit)

Illustrated in FIG. 9 is a conversion from M23 frames to M13 (or C-bit) frames at the DS3 level. In this conversion, the two-way signal converter 10 demaps given M13 frames down to a certain signal level at which DS3 framing bits have been removed. The mapper 12 receives a loopback signal from the demapper 11 and maps it into an M13 (or C-bit) signal. The reverse conversion from M13 (or C-bit) to M23 can be performed in the same way.

Figure 10:
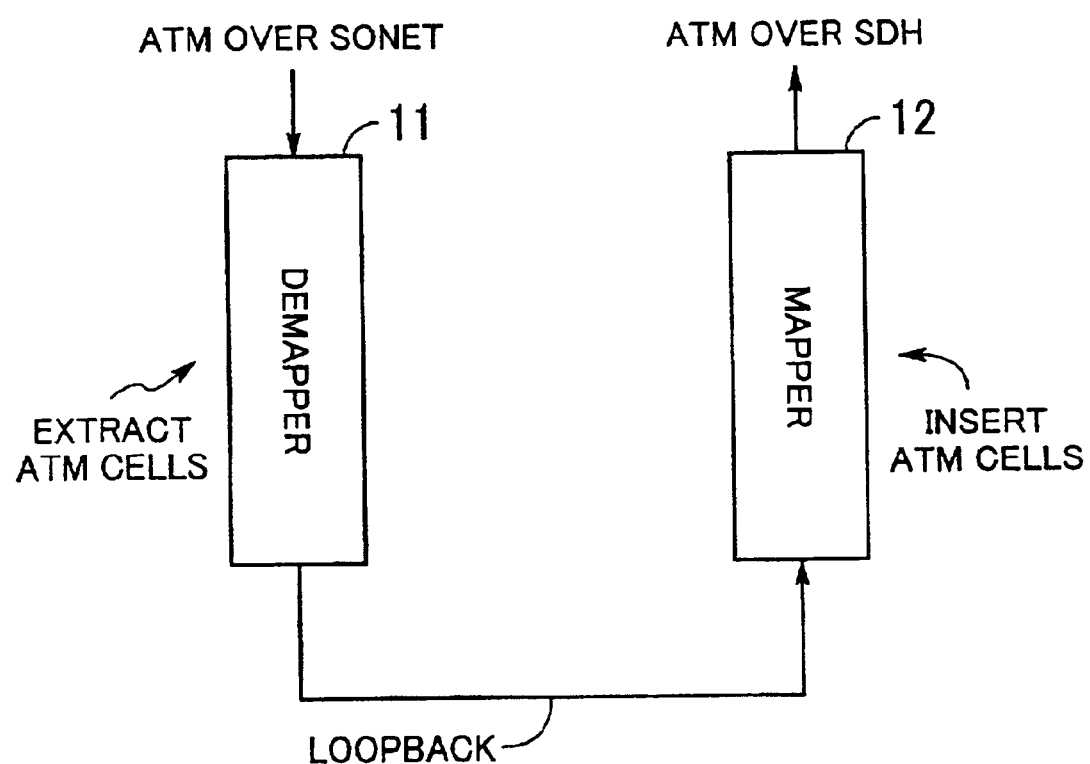
FIG. 10 depicts a conversion between transport signals including ATM cells.

According to the present invention, the two-way signal converter 10 also supports transport signals containing ATM cells. FIG. 10 depicts a conversion between signals including ATM cells. More specifically, FIG. 10 shows how "ATM over SONET" signals are converted into "ATM over SDH" signals. In the illustrated process, the demapper 11 demaps ATM cells extracted from the received "ATM over SONET" signal. The mapper 12 produces an "ATM over SDH" signal by inserting the ATM cells looped back from the demapper 11 thereto. In a similar way, the reverse conversion from "ATM over SDH" to "ATM over SONET" can be performed.

Figure 11:
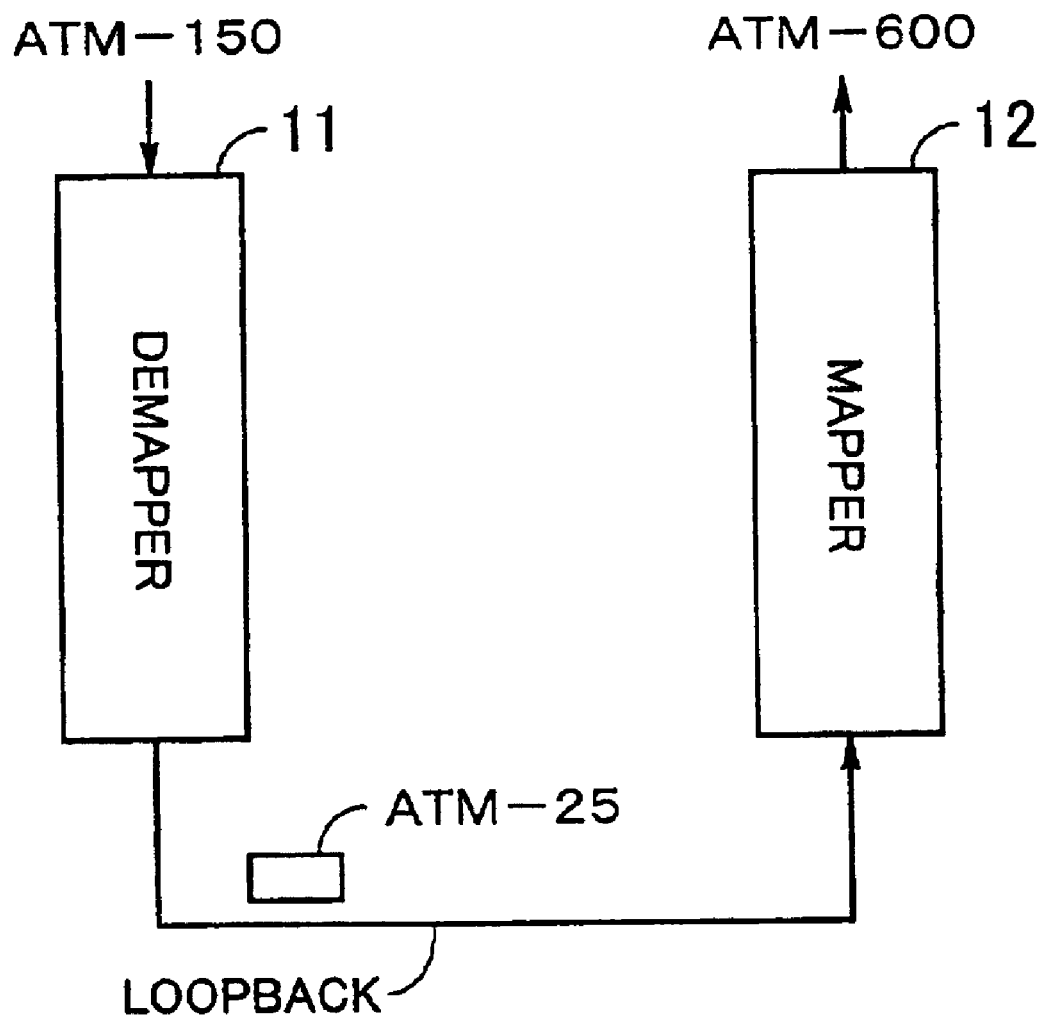
FIG. 11 depicts a conversion from ATM-150 to ATM-600.

According to the present invention, the two-way signal converter 10 can also be applied to the conversion of various Asynchrous Transfer Mode(ATM) interface specifications described in the ATM Forum standards including ATM-25, ATM-50, ATM-150, and ATM-600. Referring to FIG. 11, a conversion from ATM-150 to ATM-600 is illustrated. The demapper 11 demaps an incoming ATM-150 signal down to a certain level, e.g., ATM-25. The mapper 12 receives the resultant ATM-25 signals from the demapper 11 and maps them into ATM-600 signals. In a similar way, the reverse conversion from ATM-600 to ATM-150 can be performed.

Figure 12:
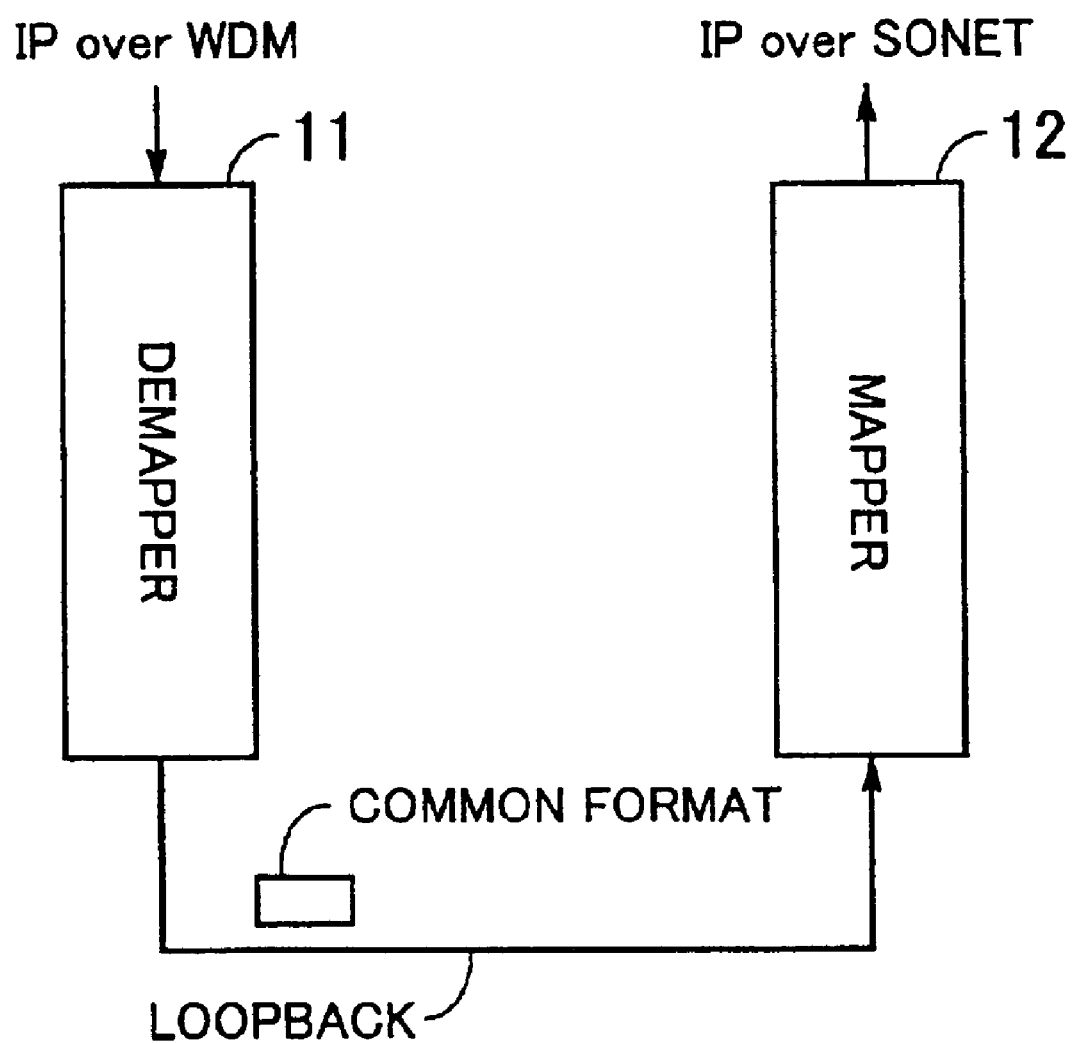
FIG. 12 depicts a conversion from "IP over WDM" to "IP over SONET"

According to the present invention, the proposed two-way signal converter 10 further supports the signal conversion between different transmission media used to transport Internet Protocal(IP) packets. Such media include: "IP over WDM," "IP over SONET," "IP over SDH," "IP over PPP," "IP over ATM," "IP over Ethernet." The present invention enables IP datagrams to be passed over those different media. Referring to FIG. 12, a signal conversion from, for example, "IP over WDM" to "IP over SONET" is explained. The demapper 11 demaps the "IP over WDM" signals down to a certain level at which the "IP over WDM" and "IP over SONET" networks share a common format. The mapper 12 then produces "IP over SONET" signals by mapping thereto the common format signal that is looped back from the demapper 11. In a similar way, the reverse conversion from "IP over SONET" to "IP over WDM" can be performed.

Figure 13:
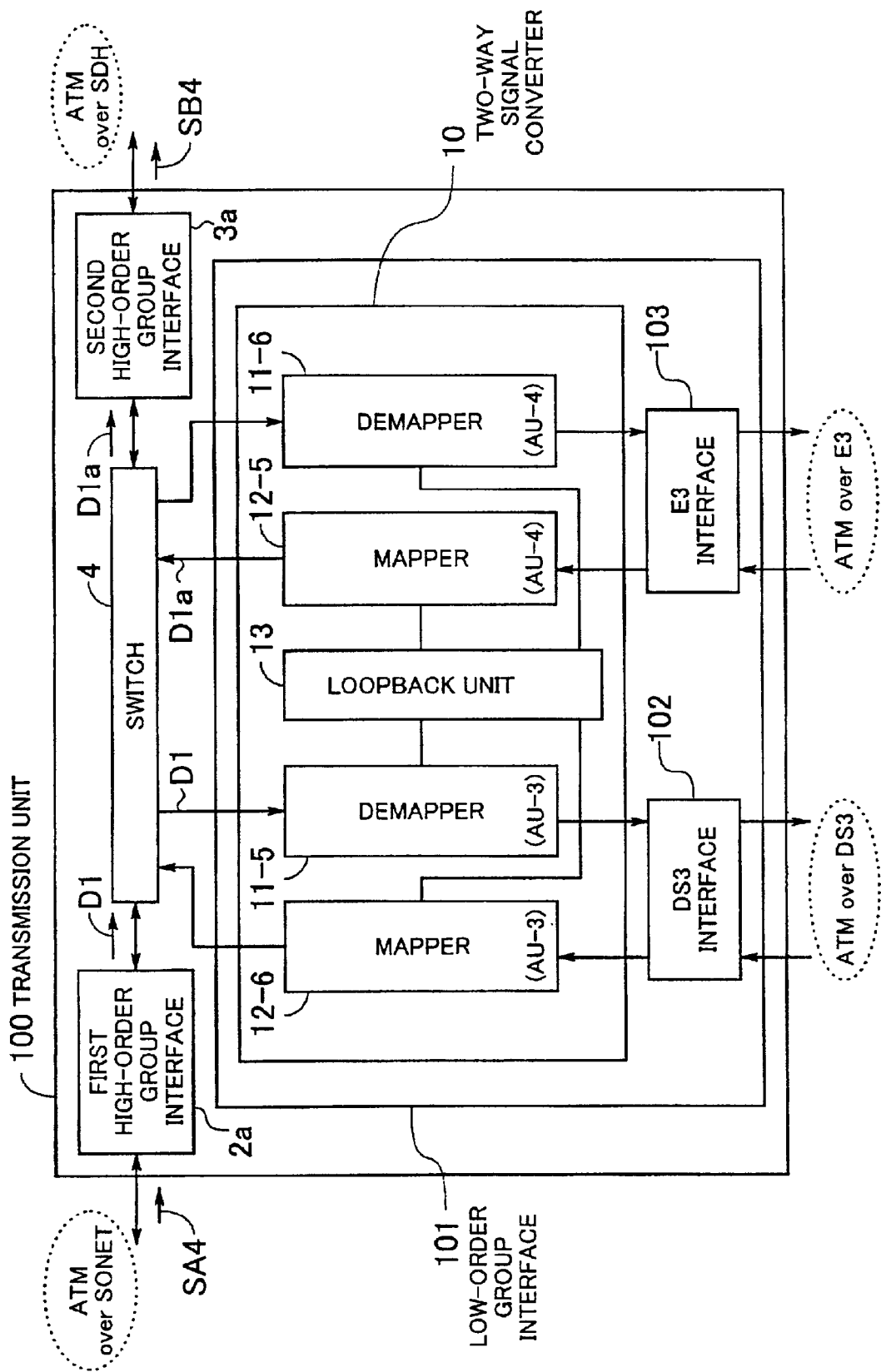
FIG. 13 is a block diagram of another transmission unit.

According to the present invention, the two-way signal converter 10 may be implemented as part of a lower-order group signal interface. FIG. 13 is a block diagram of a transmission unit 100 which serves as a network element in an ATM network. This transmission unit 100 comprises a first high-order group interface 2a, a second high-order group interface 3a, a switch 4, and a low-order group interface 101. Some of these elements have already been explained earlier in FIG. 3.

The first and second high-order group interfaces 2a and 3a transmit and receive network signals at higher levels in the multiplexing hierarchy, as in the first and second signal interfaces 2 and 3 discussed in FIG. 3. The low-order group interface 101 comprises a DS3 interface 102 and an E3 interface 103, in addition to the two-way signal converter 10 described so far. The DS3 interface 102 handles signals of "ATM over DS3," while the E3 interface 103 handles signals of "ATM over E3."

Consider, for example, a case where the "ATM over SONET" signals are subjected to the conversion to "ATM over SDH" signals. In this case, the first high-order group interface 2a receives a signal SA4 from the "ATM over SONET" network and converts it into an internal signal D1.

With its signal path selecting function, the switch 4 directs the internal signal D1 to an AU-3 demapper 11-5. The demapper 11-5 extracts ATM cells from the internal signal D1, thus demapping the received high-order signal. The loopback unit 13 provides a loopback path from the demapper 11-5 to the mapper 12-5, which executes an AU-4 level mapping by inserting the ATM cells. The resultant signal is referred to as a remapped internal signal D1a. The switch 4 routes the remapped internal signal D1a to the second high-order group interface 3a. The second high-order group interface 3 converts the remapped internal signal D1a to a second network signal SB1 for the "ATM over SDH" transport.

In parallel to the above operation, the DS3 interface 102 may receive a part of the demapped low-order signal from the demapper 11-5 and output it to the "ATM over DS3" network, applying an appropriate signal translation. It is also possible for some signals received from the "ATM over DS3" network to be routed to the mapper 12-6 through the DS3 interface 102. The mapper 12-6 converts those signals to the AU-3 level SONET signal for the "ATM over SONET" network. The same applies to the "ATM over E3" signal interface.

While the above explanation of FIG. 13 has assumed an ATM-based configuration of the low-order group interface 101, the present invention should not be limited to this particular type of transport system. The low-order group signals may include any PDH frames (e.g., DS3, E3, DS1, E1) and IP packets for LANs.

While the embodiments of the invention have been explained so far under the assumption that the switch 4 determines to which mapper or demapper each AU-3/AU-4 signal should be directed, the proposed two-way signal converter may have a dedicated function to identify the AU pointer of each frame to determine the destination of those AU-3/AU-4 signals. In the following section, this functional block will be referred to as an AU pointer handler.

Figure 14:
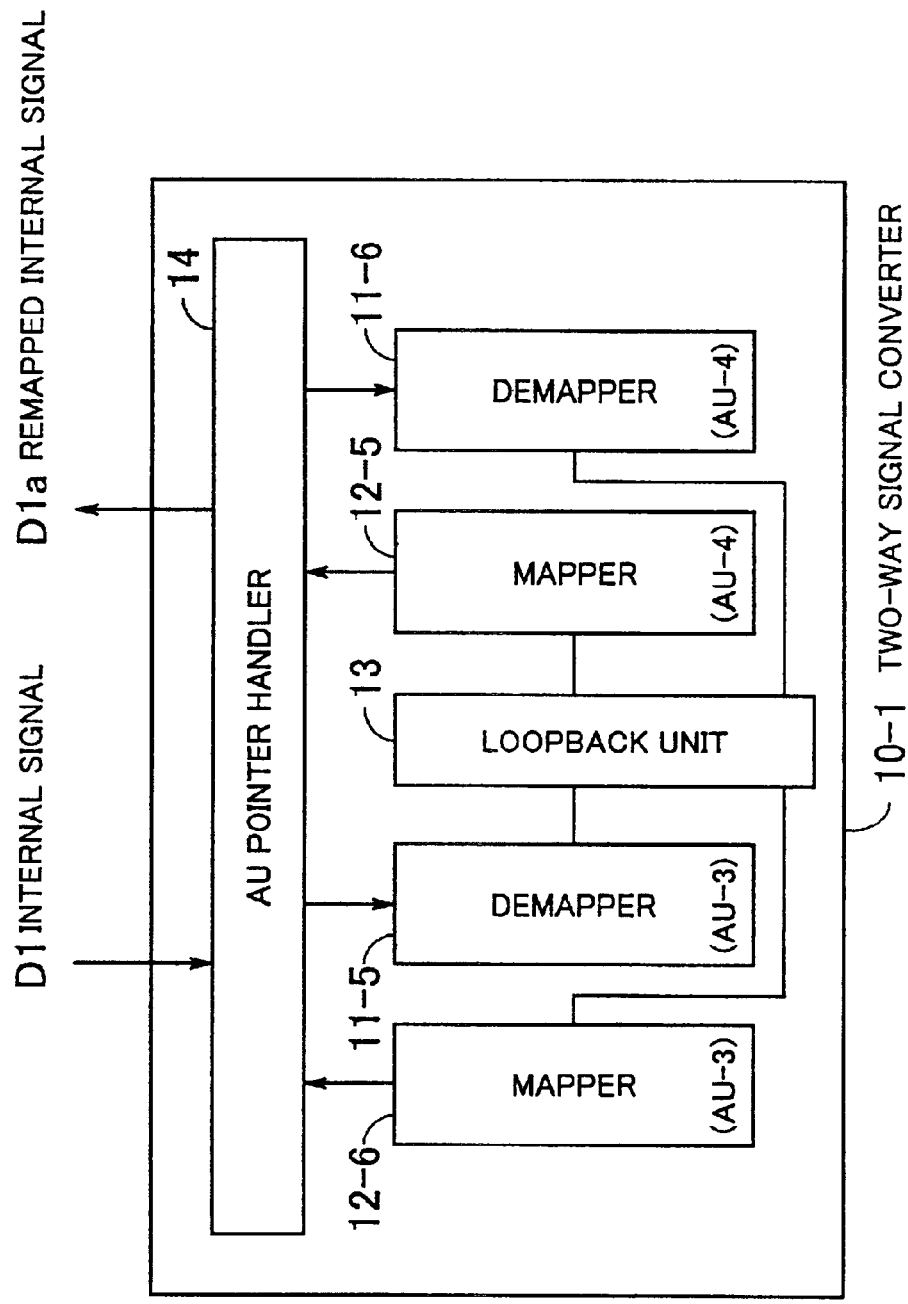
FIG. 14 is a block diagram of a two-way signal converter, which includes an AU pointer handler.

FIG. 14 is a block diagram of a two-way signal converter 10-1 which includes an AU pointer handler 14. The AU pointer handler 14 receives an internal signal D1. Based on the AU pointer found in the received internal signal D1, the AU pointer handler 14 determines whether the internal signal D1 is of AU-3 series or AU-4 series (the terms "AU-3 series" and "AU-4 series" refer to the two different hierarchical series of multiplexing levels explained earlier in FIGS. 4 to 6). The result of this test is then sent to either one of the demappers 11-5 and 11-6. After the mapping is finished, the AU pointer handler 14 inserts an appropriate AU pointer to the remapped signal, depending on which mapper is supplying the signal D1a, the AU-4 mapper 12-5 or the AU-3 mapper 12-6.

Figure 15:
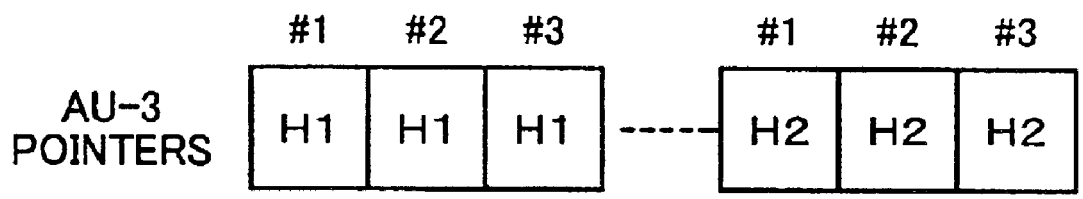
FIGS. 15 to 17 show how to distinguish between AU-3 and AU-4 signals.
Figure 16:
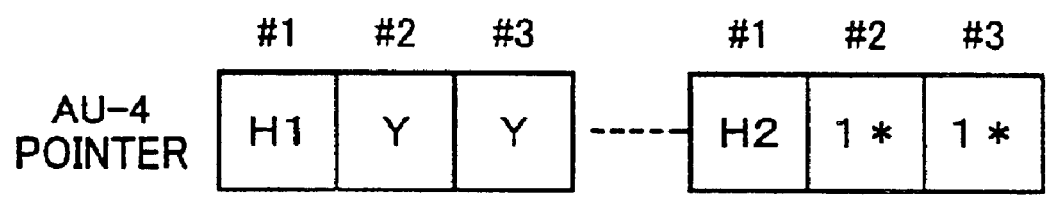
Figure 17:
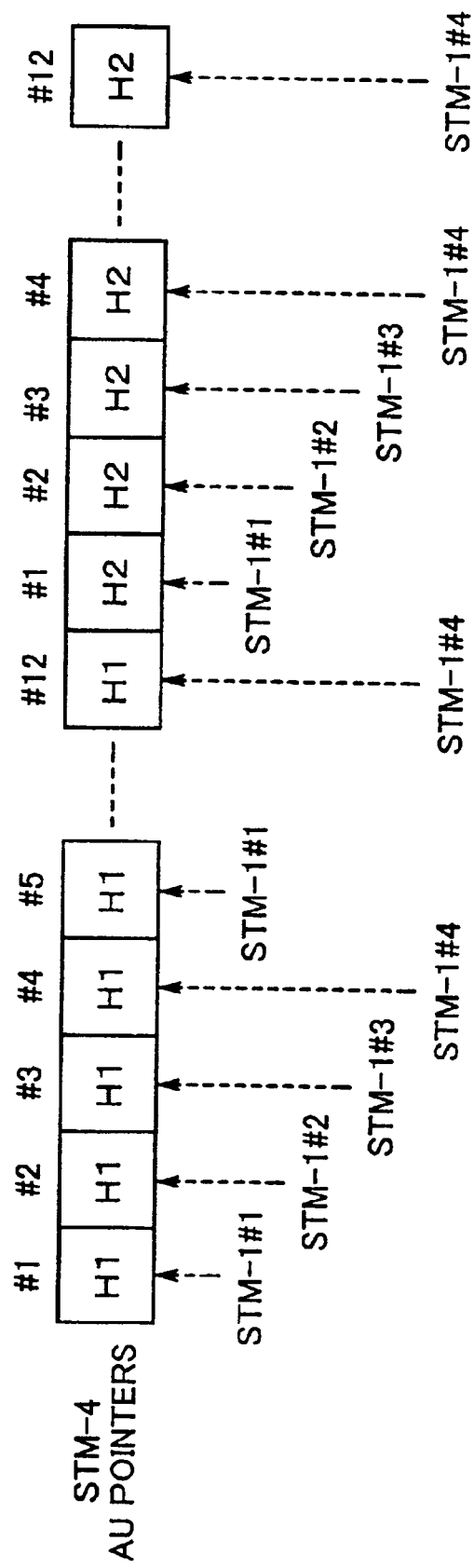

FIGS. 15 to 17 show how to distinguish between AU-3 and AU-4 signals. More specifically, FIGS. 15 and 16 show the H1 and H2 bytes in a transmission signal frame at the multiplexing level of STM-1 (SDH) or STS-3 (SONET), which are called the AU pointer bytes. Since a single STM-1 (or STS-3) is capable of carrying three VC-3 frames, the overhead provides three sets of H1 and H2 bytes. When the values contained in those three sets (#1, #2, #3) are independent of each other, as shown in FIG. 15, those bytes are interpreted as three AU-3 pointers. When only the first set (#1) of H1/H2 bytes contain a pointer value and the remaining sets (#2 and #3) are dependent to the first one, as shown in FIG. 16, those bytes are interpreted as an AU-4 pointer. In the case of AU-4 pointers, the second and third H1 bytes (Y) hold a value of "1001SS11" in binary notation, and the second and third H2 bytes are set to all ones (1*).

Referring now to FIG. 17, the AU pointers in an STM-4 frames is depicted. Since four STM-1 frames are multiplexed into one STM-4 frame, the STM-4 AU pointers include four STM-1 pointers as indicated by the suffixes #1 to #4 in FIG. 17. Accordingly, the STM-4 frames are demultiplexed to the STM-1 level, and each STM-1 pointer is then extracted and subjected to the AU-3/AU-4 test that has been described in FIGS. 15 and 16.

Another way to determine the destination of AU-3/AU-4 signals is to examine the value of E1 byte contained in each section overhead. To implement this function, the proposed two-way signal converter 10 has an E1 byte handler.

Figure 18:
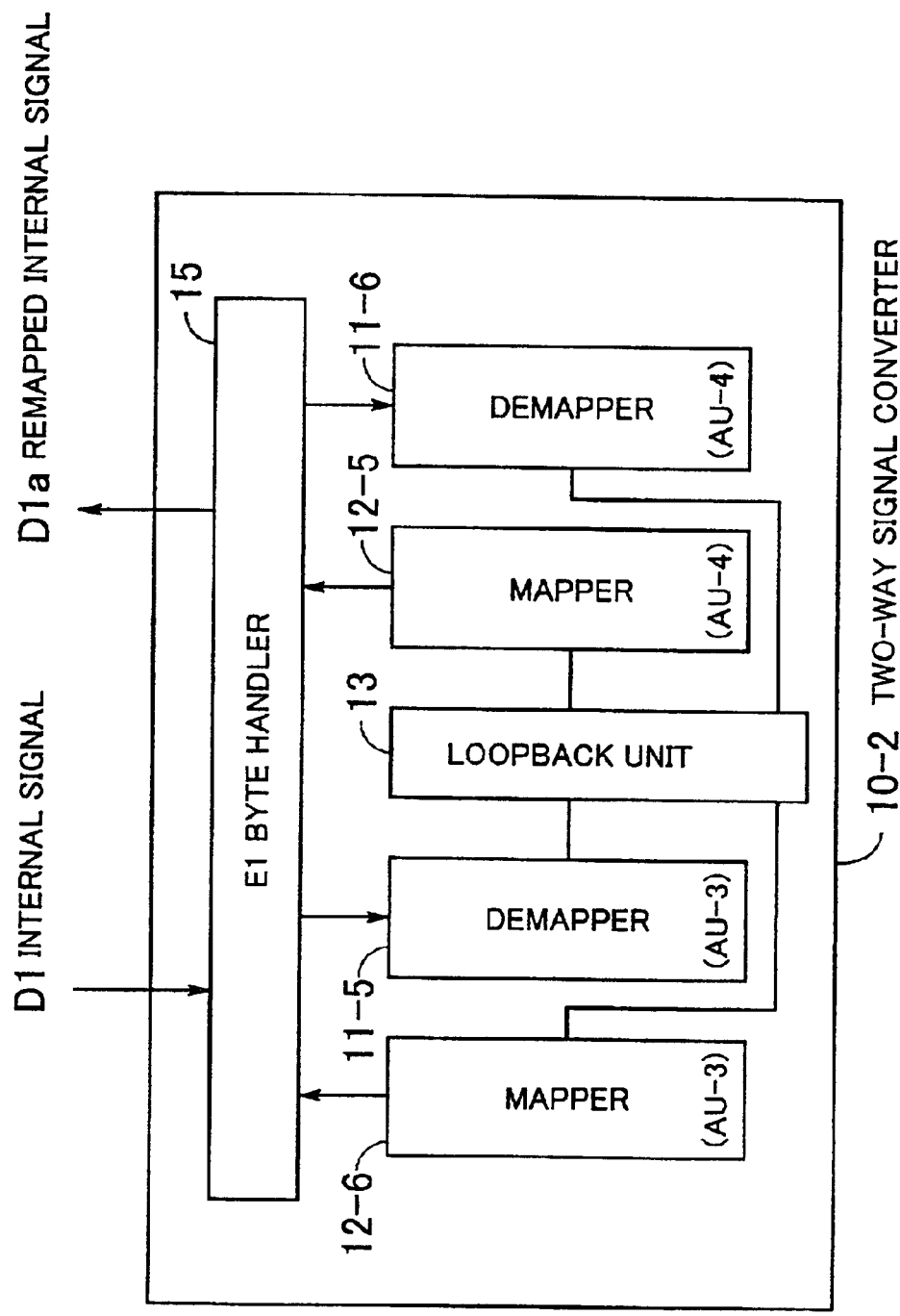
FIG. 18 is a block diagram of another two-way signal converter, which includes an E1 byte handler.

FIG. 18 shows the structure of a two-way signal converter 10-2 including an E1 byte handler 15. This E1 byte handler 15 receives an internal signal D1 and examines its E1 byte to determine whether the internal signal D1 is of AU-3 series or AU-4 series. The result of this test is then sent to either one of the demappers 11-5 and 11-6. After the mapping is finished, the E1 byte handler 15 sets an appropriate value to E1 byte of the remapped signal D1a, depending on which mapper is supplying the signal D1a, the AU-4 mapper 12-5 or the AU-3 mapper 12-6.

FIGS. 19 and 20 show the location and definition of E1 byte in the overhead. More specifically, FIG. 19 depicts an STM-4 (SDH) or STS-12 (SONET) overhead, where E1 byte is located on the first column of the second block. Referring to FIG. 20, the first two bits #1 and #2 of E1 byte are unused. Bit #3, when it is set to "1," indicates AU-4-16c (SDH) or STS-48c (SONET). Likewise, bit #4 indicates AU-4-4c or STS-12c; Bit #5 indicates AU-4#4 or STS-3c#4; Bit #6 indicates AU-4#3 or STS-3c#3; Bit #7 indicates AU-4#2 or STS-3c#2; Bit #8 indicates AU-4#1 or STS-3c#1.

When bit #3 is set to zero, it means the frame is neither AU-4-16c nor STS-48c. When bit #4 is set to zero, it means the frame is neither AU-4-4c nor STS-12c. When bits #5 to #8 are all set to zero, it means that the frame is AU-3 (SDH) or STS-1 (SONET).

Figure 21:
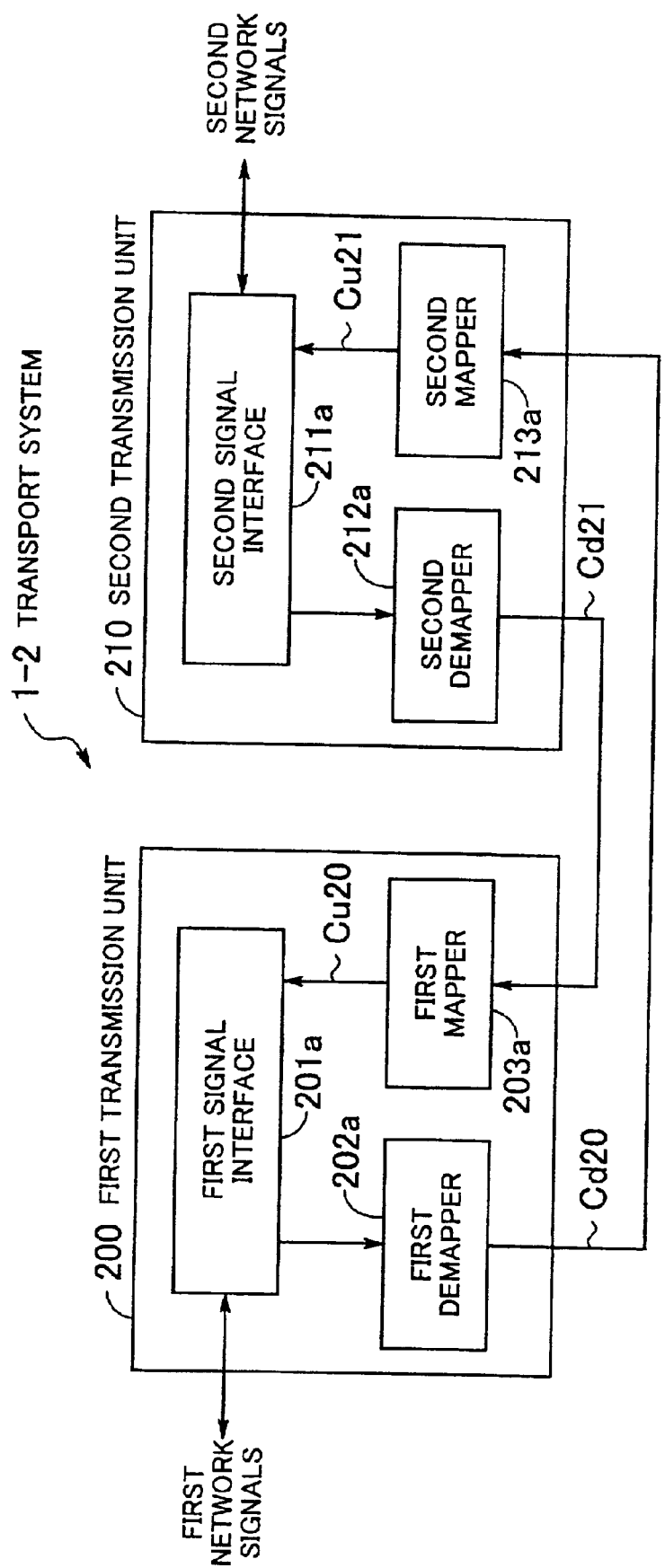
FIG. 21 is a block diagram of a transport system.

Referring next to FIG. 21, a transport system according to the present invention is shown. This transport system 1–2 is a variation of the transmission unit 1 described earlier in FIG. 1, where its original functional blocks are implemented into two separate pieces of network equipment, a first transmission unit 200 and a second transmission unit 210.

The first transmission unit 200 comprises a first signal interface 201a, a first demapper 202a, and a first mapper 203a. The first signal interface 201a transmits and receives first network signals. The first demapper 202a produces first lower-level signals Cd20 by converting a given signal down to a lower hierarchical level at which the first and second network systems are compatible with each other in terms of logical signal structure. The first mapper 203a, on the other hand, produces a first higher-level signal Cu20 by converting given second lower-level signals Cd21, which are supplied from the second transmission unit 210, to an upper hierarchical level which complies with the first network signal specifications. The first higher-level signal Cu20 is sent out to the first network through the first signal interface 201a.

The second transmission unit 210 comprises a second signal interface 211a, a second demapper 212a, and a second mapper 213a. The second signal interface 211a transmits and receives second network signals. The second demapper 212a produces second lower-level signals Cd21 by converting the received second network signal down to a lower hierarchical level at which the first and second network systems are compatible with each other in terms of logical signal structure. The second mapper 213a produces a second higher-level signal Cu21 by converting the first lower-level signals Cd20, which are supplied from the first transmission unit 200, to an upper hierarchical level which complies with the second network signal specifications. The second upper level signal Cu21 is sent out to the second network through the second signal interface 211a.

Figure 22:
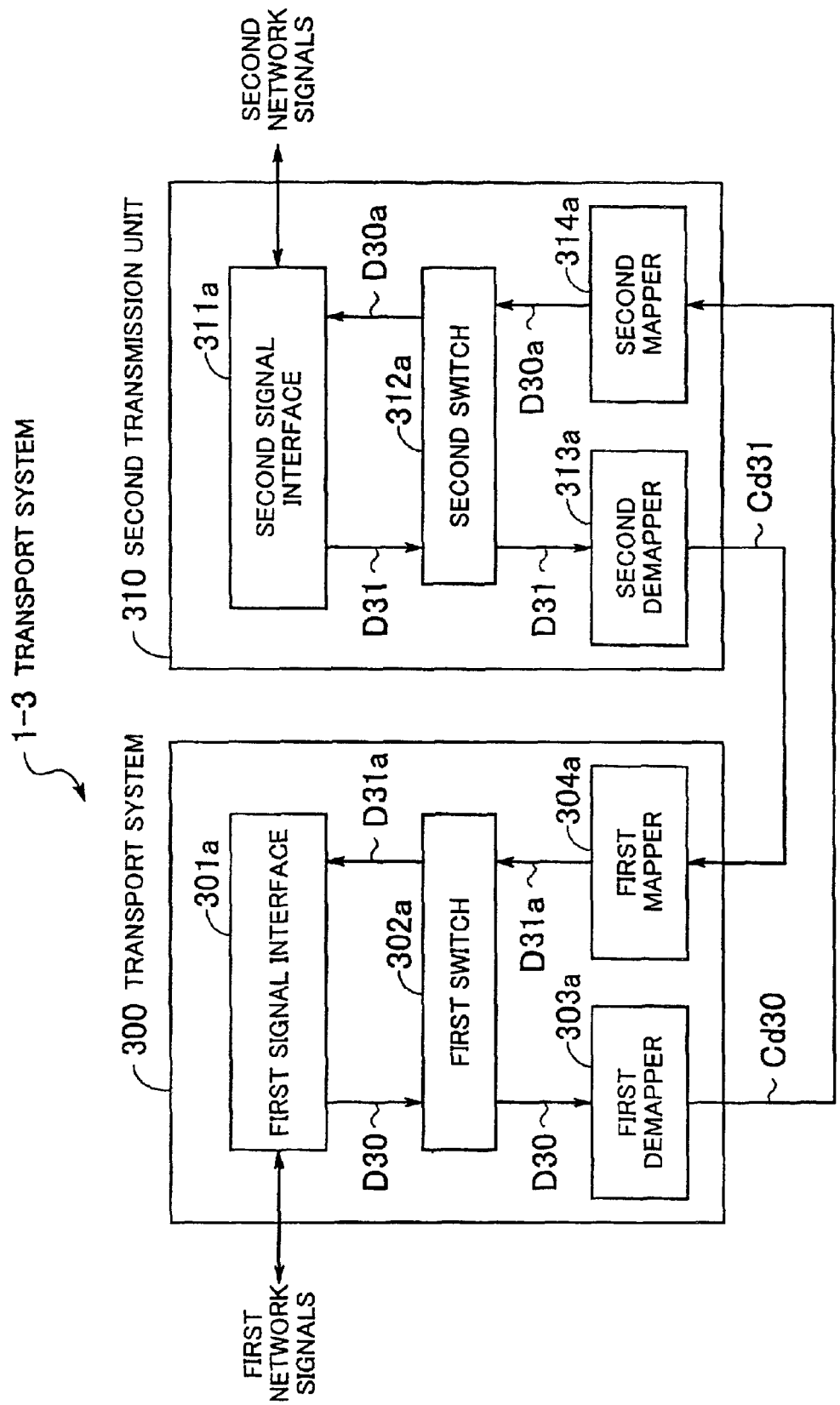
FIG. 22 is a block diagram of another transport system.

FIG. 22 is a block diagram of another transport system 1–3. This transport system 1–3 is a divided version of the transmission unit la described earlier in FIG. 3, where its original functional blocks are implemented into two separate pieces of equipment, a first transmission unit 300 and a second transmission unit 310.

The first transmission unit 300 comprises a first signal interface 301a, a first switch 302a, a first demapper 303a, and a first mapper 304a. The first signal interface 301a receives a first network signal and converts it into a first internal signal D30 with a certain fixed bit rate. It also outputs a first network signal which is produced by converting a second remapped internal signal D31a up to the required level. The first switch 302a controls where to direct the first internal signal D30 and second remapped internal signal D31a.

The first demapper 303a produces first lower-level signals Cd30 by converting the first internal signal D30 down to a lower hierarchical level at which the first and second network systems are compatible with each other in terms of logical signal structure. The first mapper 304a receives second lower-level signals Cd31 from the second transmission unit 310 and converts them to an upper hierarchical level, thereby producing a second remapped internal signal D31a that is compatible with the first network specifications.

The second transmission unit 310 comprises a second signal interface 311a, a second switch 312a, a second demapper 313a, and a second mapper 314a. The second signal interface 311a receives a second network signal and converts it into a second internal signal D31 with a certain fixed bit rate. It also outputs a second network signal which is produced by converting the first remapped internal signal D30a up to the required level. The second switch 312a controls where to direct the second internal signal D31 and first remapped internal signal D30a. The second demapper 313a produces second lower level signals Cd31 by converting the given second internal signal D31 down to a lower hierarchical level at which the first and second network systems are compatible with each other in terms of logical signal structure. The second mapper 314a receives the first lower level signals Cd30 from the first transmission unit 300 and converts them to an upper hierarchical level, thereby producing the first remapped internal signal D30a that is compatible with the second network specifications.

Figure 23:
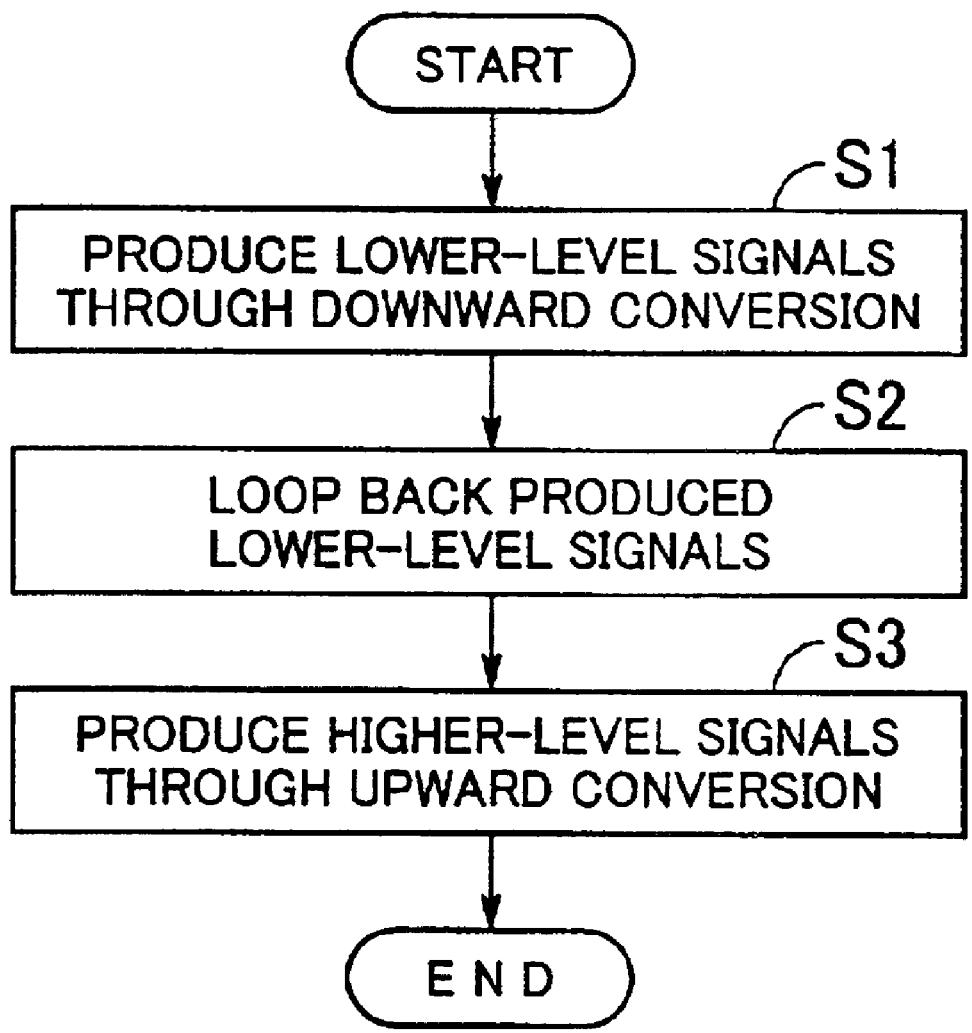
FIG. 23 is a flowchart of a two-way signal conversion method according to the present invention.

According to the present invention, a two-way signal conversion method is provided to convert transport signals between a first and second networks. FIG. 23 is a flowchart of the proposed method, which comprises the following steps:

(S1) Producing lower-level signals by converting a first and second incoming network signals down to a lower hierarchical level at which the first and second network systems are compatible with each other in terms of logical signal structure.

(S2) Looping back the produced lower-level signals at the lower hierarchical level, so as to subject them to intended upward conversions (which will be provided in the next step).

(S3) Producing higher-level signals by converting each given lower-level signal up to a higher hierarchical level which complies with the first or second network system, whereby the lower-level signal resulting from the first incoming network signal will be converted into an outgoing signal to the second network system, and the lower-level signal resulting from the second incoming network signal will be converted into an outgoing signal to the first network system.

According to one aspect of the proposed method, overhead information contained in the first and second incoming network signals is terminated during the downward conversion process. After loopback, overhead information is inserted to outgoing signals during the upward conversion process.

According to another aspect of the proposed method, stuff data contained in the first and second incoming network signals is located and removed during the downward conversion. During the subsequent upward conversion, stuff data is inserted to appropriate part of the outgoing signals, so as to comply with the first and second network systems.

According to yet another aspect of the proposed method, the transmission rates of network signals are converted from one to the other. The proposed method supports various patterns of rate conversions, such as: TU-11 to TU-12, TU-11 to VT-2, VT-1.5 to TU-12, and VT-1.5 to VT-2.

According to still another aspect of the proposed method, ATM cells are extracted from the first or second incoming network signal during the downward conversion process, and the ATM cells are inserted to the outgoing signals during the subsequent upward conversion process.

According to still another aspect of the proposed method, network signals containing IP packets are subjected to the conversions. The first and second incoming network signals are converted down to signals having a common format, which are then upward-converted to higher-level signals.

According to still another aspect of the proposed method, various types of network signal conversions are supported. One such type is two-way conversions between high-order group signals belonging to different hierarchical series of signals. Another type is two-way conversions between low-order group signals belonging to different hierarchical series of signals. Still another type is two-way conversions between a high-order group signal and a low-order group signal which belong to different hierarchical series of signals.

According to still another aspect of the proposed method, various types of transport systems can be converted. One such type is two-way conversions between SDH signals and SONET signals. Another type is two-way conversions between such signals that belong to the same hierarchical series of signals, but have different levels in the hierarchy. PDH signals and ATM signals can also be handled.

According to still another aspect of the proposed method, the first and second incoming network signals are converted to lower-level signals according to their respective AU pointer types. It is also possible to use E1 byte or any other bytes in the overhead field of internal signals, unless they are assigned for other purposes.

According to still another aspect of the proposed method, a network management console may be used for operations and maintenance of the conversions of the network signals.

The next section will present several possible system configurations where the proposed two-way signal converter is implemented as part of a low-order group interface. FIG.

24 shows a first such system, which comprises: a plurality of higher-rate interfaces 402 and 403, a cross-connect unit 404, and a plurality of low-order group interfaces 410. The higher-rate interfaces 402 and 403 handle both AU-3 and AU-4 signals. The cross-connect unit 404 acts as what has been described as the switch 4. The low-order group interfaces 410 support DS1 (T1) and E1 (D12) signals, providing a capacity of 28 channels per interface for DS1 and 21 channels per interface for E1. The higher-rate interfaces 402 and 403, on the other hand, support multi-channel transport signals of STM-64 (OC-192), STM-16 (OC-48), STM-4 (OC-12), or STM-1 (OC-3).

Whatever rates the transport signals may have, the internal main signal circuits interconnecting the higher-rate interfaces 402 and 403, cross-connect unit 404, and low-order group interfaces 410 operate at a unified rate of 622 Mbps, which is equivalent to the STM-4 (STS-12) rate. Actually, this internal rate depends on the system configuration; a higher rate (e.g., 2.4 Gbps) or a lower rate (e.g., 155 Mbps) may be selected if it is more appropriate. The high-rate interfaces 402 and 403 have demultiplexing and multiplexing functions to convert the network transport signals to this internal signal level. Likewise, the low-order group interfaces 410 have like functions to convert the low-order group signals (DS1, E1) to that signal level.

More specifically, the low-order group interfaces 410 are equipped with two types of demappers (demultiplexers/demappers) and mappers (mappers/multiplexers) for the conversion of 622 Mbps frames to/from DS1 and E1 signals. One type is intended for AU-4 signals, and the other type is for AU-3 signals; they are therefore referred to as "AU-4 mappers and demappers" and "AU-3 mappers and demappers," respectively.

Figure 24:
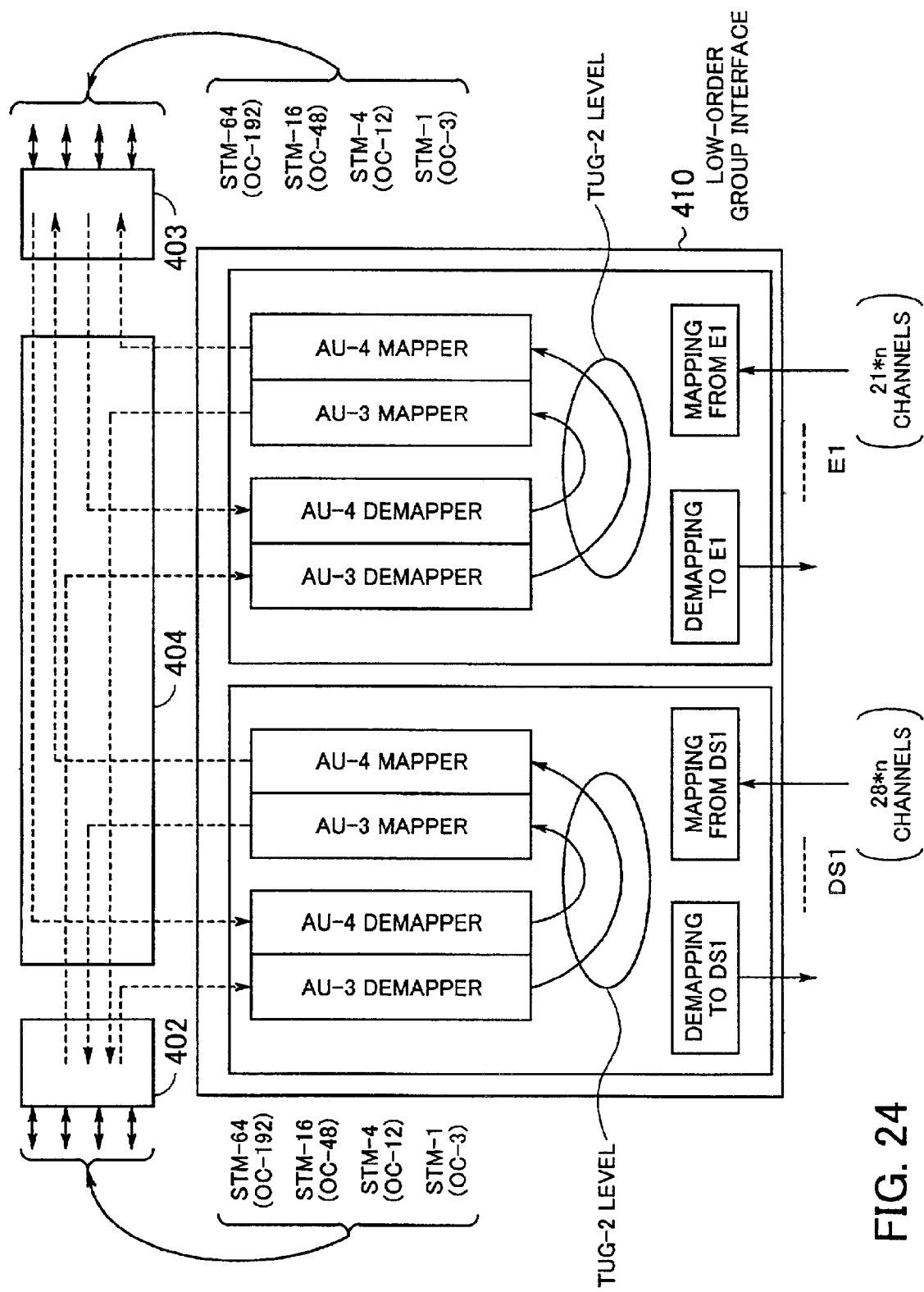
FIG. 24 is a diagram which shows a first system configuration according to the present invention.

As seen from FIG. 24, the low-order group interfaces 410 receive 622-Mbps signals from the cross-connect unit 404 and demultiplex them to the TUG-2 level. These TUG-2 signals are looped back and multiplexed to the STM-n level (n: 1, 4, 16, 64 . . . ), which is an SDH signal equivalent to STS-3*n or OC-3*n in SONET. An STM-n signal containing AU-3 frames can be converted into another type of STM-n signal containing AU-4 frames, through the use of an AU-3 demapper in combination with an AU-4 mapper. In a similar way, an STM-n signal containing AU-4 frames can be converted into another type of STM-n signal containing AU-3 frames.

Figure 25:
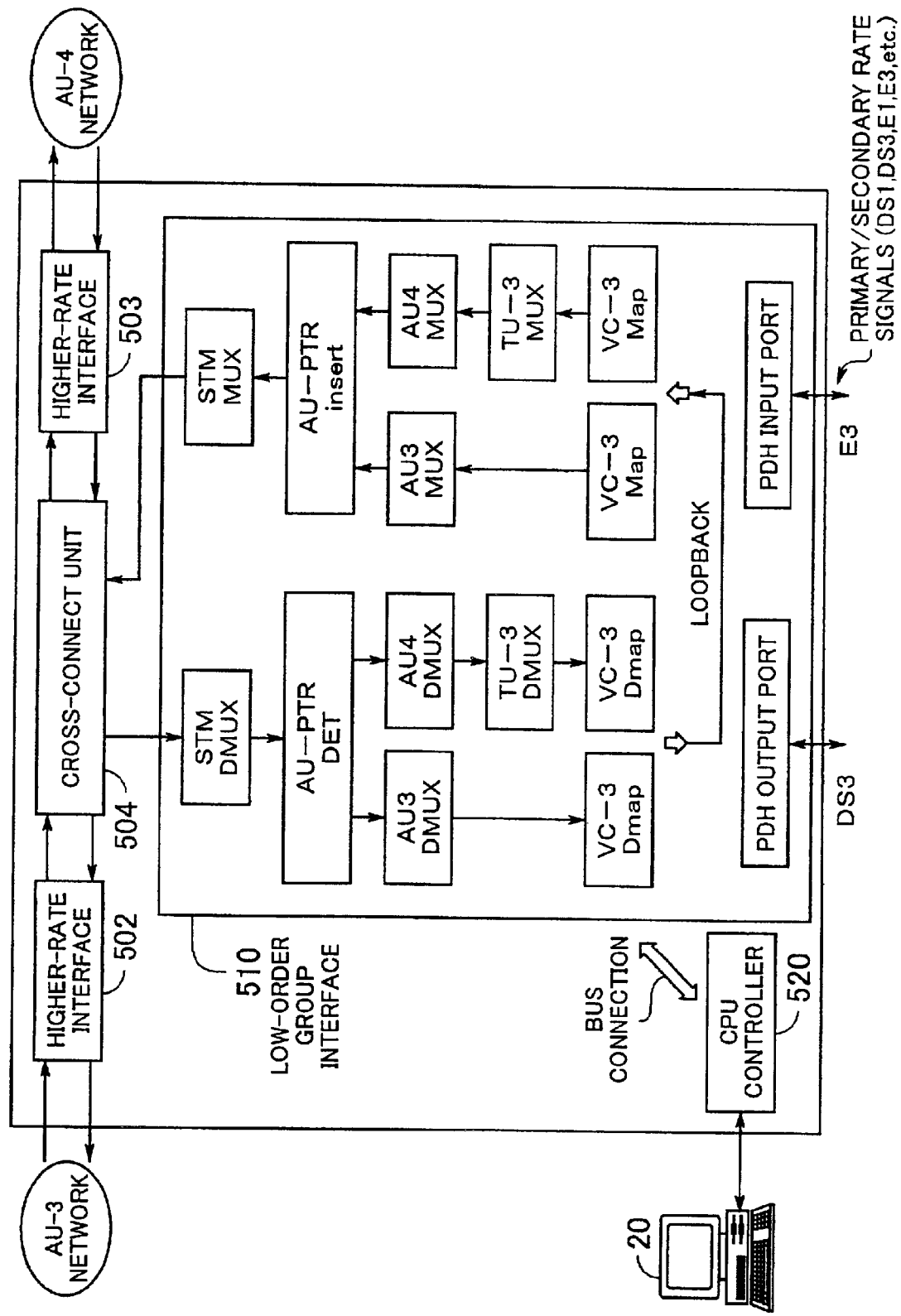
FIG. 25 is a diagram which shows a second system configuration.

FIG. 25 shows a second system configuration according to the present invention. As previously described, the VC-3 frame in AU-3 signals is different from that in AU-4 signals in the arrangement of stuff columns. The second system configuration copes with this difference, employing a low-order group interface 510 which maps and demaps (or multiplexes and demultiplexes) both AU-3 and AU-4 signals. This low-order group interface 510 comprises a demapper/demultiplexer section (i.e., the left-hand blocks in FIG. 25) and a mapper/multiplexer section (the right-hand blocks). The blocks named "AU-PTR-DET" and "AU-PTR insert" perform the termination and insertion of AU pointer in the course of demultiplexing and multiplexing processes. For ease of subsequent cross-connect processing, a fixed value (e.g., 522) is given to the AU pointer at this stage.

Other functional blocks of the illustrated network element include: a higher-rate interfaces 502 and 503, a cross-connect unit 504, and a CPU controller 520. The cross-connect unit 504 supplies the low-order group interface 510 with higher-level frames in an appropriate internal signal format (e.g., STM-4/STS-12 level). The low-order group interface 510 demultiplexes or demaps those incoming signals, depending on which hierarchical series of multiplexing levels they belong to. This enables the stuff bytes in a VC-3 signal to be located and processed correctly. The demapping of VC-3 signals results in low-level signals whose format is common to the AU-3 and AU-4 series networks, which are routed to the mapper/multiplexer section. (Loopback paths, however, may be created at a still lower level, if required.)

The mapper/multiplexer section has to be configurable to yield a desired hierarchical series. To this end, the low-order group interface 510 employs, for example, some provision registers which can be set up from a network management console 20 through the CPU controller 520.

Figure 26:
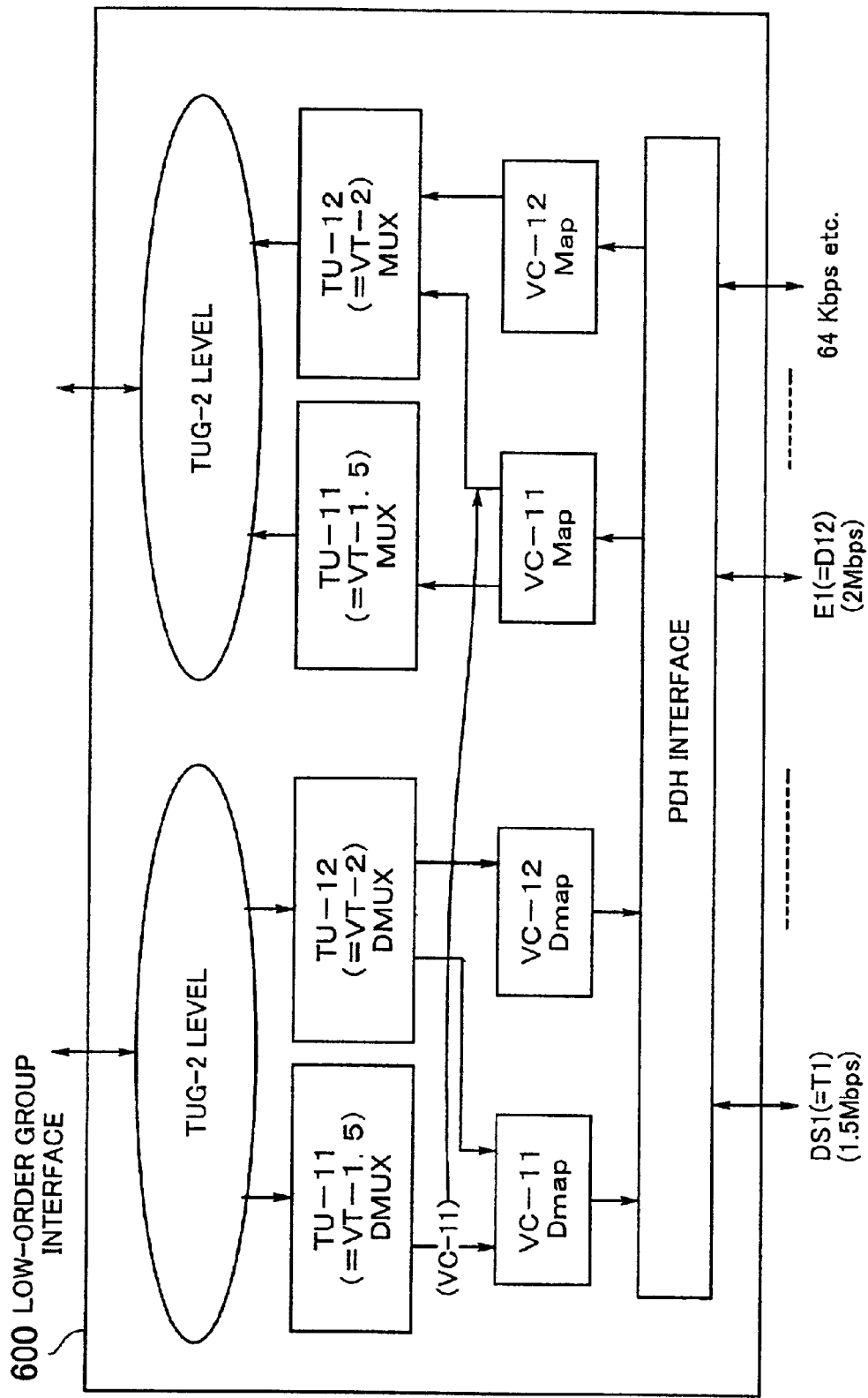
FIG. 26 is a diagram which shows a third system configuration.

FIG. 26 shows a third system configuration according to the present invention. The illustrated low-order group interface 600 supports DS1 (T1), E1 (D12), 64 Kbps, and other PDH signals, as well as signals on which ATM cells are mapped. Its PDH interface enables those signals to be handled at the rate of 622 Mbps inside the low-order group interface 600.

The low-order group interface 600 communicates with higher-level facilities (not shown) at the TUG-2 level (seven TUG-2 signals are multiplexed into a single STS-1/TU-3/VC-3 frame). The low-order group interface 600 provides functions to demultiplex those TUG-2 signals down to TU-12 (VT-2) and TU-11 (VT-1.5) levels, as well as multiplexing signals in the opposite direction. The TU-11 multiplexer (MUX) and demultiplexer (DMUX) are linked to the VC-11 mapper and demapper, respectively. Likewise, the TU-12 multiplexer and demultiplexer are coupled to the VC-12 mapper and demapper, respectively. Further, the TU-12 demultiplexer has a link to the VC-11 demapper, and the VC-11 mapper has a link to the TU-12 multiplexer.

The above-described system converts a high-level signal containing TU-11 to a TU-12 containing signal as follows. Suppose, for example, that a signal carrying DS1 (T1) traffic is to be remapped into TU-12. In this case, the low-order group interface 600 has to be configured in such a way that the VC-11 output of the TU-11 demultiplexer will be looped back to the TU-12 multiplexer, instead of routing it to the VC-11 demapper. This enables the VC-11 virtual containers to be aligned into TU-12 tributary units and then multiplexed into TUG-2 signals. (If necessary, the loopback path may be created at a still lower level.)

Figure 27:
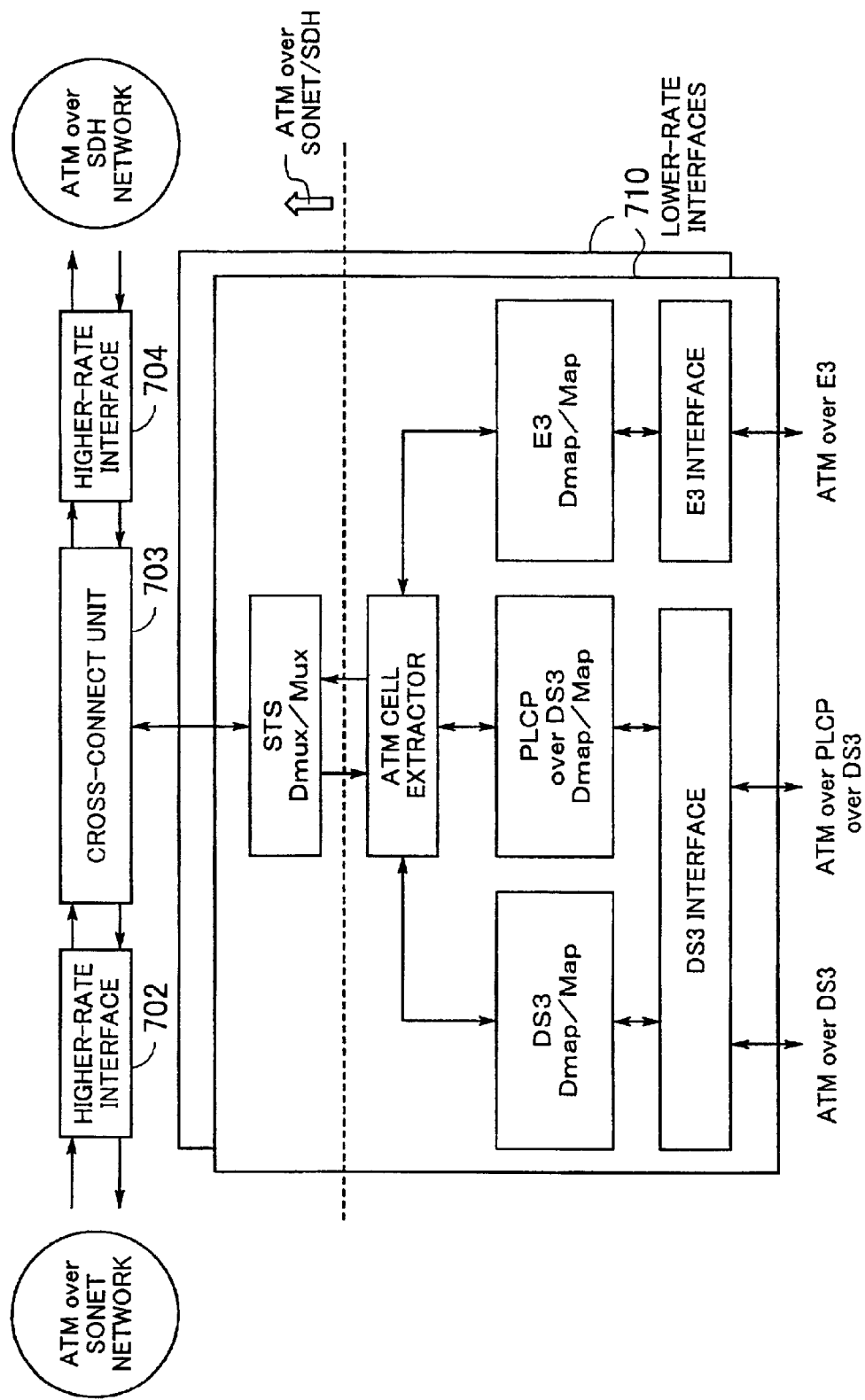
FIG. 27 is a diagram which shows a fourth system configuration.

FIG. 27 shows a fourth system configuration according to the present invention. This system comprises higher-rate interfaces 702 and 704, a cross-connect unit 703, and lower-rate interfaces 710. One high-rate interface 702 is connected to an "ATM over SONET" network, while the other high-rate interface 704 to an "ATM over SDH" network. The lower-rate interface 710, on the other hand, serves for such channels as "ATM the over DS3," "ATM the over PLCP over DS3," and "ATM over E3." The fourth system configuration permits conversion between such various ATM cell-carrying frames.

The lower rate interface 710 communicates with the cross-connect unit 703 at the STS or equivalent level at 622 Mbps or 155 Mbps rates. As FIG. 27 shows, the upper part of each lower-rate interfaces 710 provides an STS demultiplexer/multiplexer. Besides demultiplexing those STS-level signals to extract ATM cells therefrom, the STS demultiplexer/multiplexer maps ATM cells to the payload field of STS frames. The lower part of the lower-rate interfaces 710 comprises: an ATM cell extractor, a DS3 and E3 interfaces, a DS3 demapper/mapper, an E3 demapper/ mapper, and a Physical Layer Convergence Protocol (PLCP) demapper/mapper. These elements extracts ATM cells from lower-rate PDH signals of D3 and E3, as well as mapping ATM cells into PDH frames.

In the above-described lower-rate interfaces 710, ATM cell alignment is identified by locating each ATM cell header in the demapped frame signal stream. Now that ATM cells are extracted, some of them are looped back inside the ATM cell extractor itself. In this way, higher-level frames can be converted through the use of ATM cell loopback paths.

Figure 28:
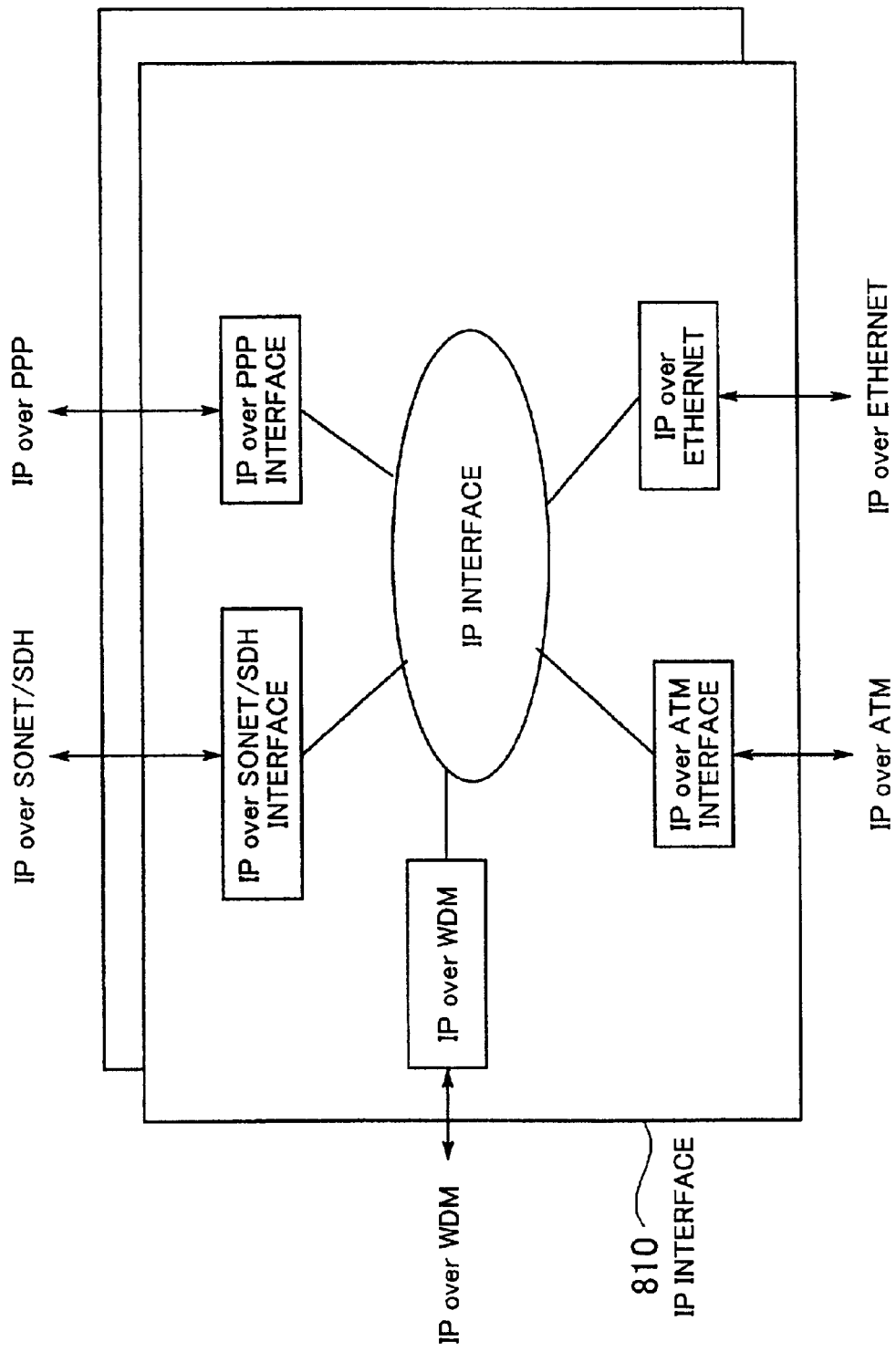
FIG. 28 is a diagram which shows a fifth system configuration.

FIG. 28 shows a fifth system configuration according to the present invention. The illustrated network element comprises IP interfaces 810 which interconnect various types of transport media for IP packet traffic, such as "IP over WDM," "IP over SONET/SDH," "IP over PPP," "IP over ATM," and "IP over Ethernet." This IP interface 810 provides an interface function that supplies a cross-connect unit (not shown) and other part of the network element with IP packet-level signals extracted from those signal frames. By giving appropriate destinations to such IP packet-level signals, the IP interface 810 provides frame conversion functions.

Although not shown in FIG. 28, the network element may have to serve more complex transport mechanisms, such as: "IP over PPP over SONET," "IP over ATM over SONET," "IP over SONET over WDM," "IP over PPP over SONET over WDM," and "IP over ATM over SONET over WDM." Even in such complex cases, the network element can provide frame conversion functions by demapping those frame signals down to "IP over PPP," "IP over ATM," or like levels and subjecting them to the IP interface 810.

The above description of the preferred embodiments will now be summarized below. According to the present invention, the proposed transmission unit and two-way signal conversion method produce lower-level signals by converting incoming network signals down to a lower hierarchical level at which the first and second network systems are compatible with each other in terms of logical signal structure. These lower-level signals are looped back to an upward conversion process where given signals are multiplexed into a higher hierarchical level. This structural arrangement enables efficient conversions between signals having different specifications in terms of multiplexing hierarchy, as well as providing a better service quality. The transport signals handled by the proposed transmission unit may be electric signals or optical signals. In the latter case, the transmission unit may be configured to use optical multiplexer/demultiplexer and optical cross-connect facilities as its integral functions.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission unit which transmits and receives digital signals over a first and second network systems, comprising:

(a) a first signal interface means for receiving a first network signal and converting the received first network signal into a first internal signal with a fixed bit rate, and for sending an outgoing first network signal which is converted from a given second remapped internal signal with the same fixed bit rate;

(b) a second signal interface means for receiving a second network signal and converting the received second network signal into a second internal signal with the fixed bit rate, and for sending out an outgoing second network signal which is converted from a given first remapped internal signal with the same fixed bit rate;

(c) a two-way signal conversion means for making conversions between the first and second network signal, comprising:

a downward conversion means receiving the first and second internal signals and producing lower-level signals by converting the first and second internal signals down to a lower hierarchical level at which the first and second network systems are compatible with each other in terms of logical signal structures, an upward conversion means for producing a first or second remapped internal signal by convening a given lower-level signal up to a higher hierarchical level which complies with the first or second network system, and a looping back means for looping back, at the lower hierarchical level, the lower-level signals from said downward conversion means to said upward conversion means to cause the lower-level signals deriving from the received first and second network signals to be converted to the first and second remapped internal signals, respectively;

(d) a switching means for providing and controlling circuit paths to route the first internal signal, the second internal signal, the first remapped internal signal, and the second remapped internal signal; and wherein said two-way signal conversion means makes the conversions between the first and second network signals which include at least one of:

two-way conversions between Synchronous Digital Hierarchy(SDH) signals and Synchronous Optical Network(SONET) signals;

two-way conversions between Plesiochronous Digital Hierarchy(PDH) signals; and two-way conversions between Asynchronous Transfer Mode(ATM) signals.

2. The transmission unit according to claim 1, wherein:

said downward conversion means terminates overhead information contained in the first and second internal signals during the downward conversion; and said upward conversion means inserts overhead information to the first and second remapped internal signals during the upward conversion.

3. The transmission unit according to claim 1, wherein:

said downward conversion means locates stuff data contained in the first and second internal signals, and removes the stuff data during the downward conversion; and said upward conversion means inserts stuff data to the first and second remapped internal signals, considering which part of such signals should be stuffed so as to comply with the first and second network systems, respectively.

4. The transmission unit according to claim 1, wherein said two-way signal conversion means makes transmission rate conversions between the first and second network signals.

5. The transmission unit according to claim 4, wherein said two-way signal conversion means performs at least one of;

a conversion from Tributary Unit 11 (TU-11 to TU-12;
a conversion from TU-11 to Virtual Tributaries 2(VT-2);
a conversion from VT-1.5 to TU-12; and
a conversion from VT-1.5 to VT-2.

6. The transmission unit according to claim 1, wherein:
said downward conversion means extracts ATM cells from the first or second internal signal during the downward conversion; and
said upward conversion means produces the first or second remapped internal signal by inserting the ATM cells during the upward conversion.

7. The transmission unit according to claim 1, wherein
the received first and second network signals contain Internet Protocal(IP) packets;
said downward conversion means produces the lower-level signals by converting the first and second internal signals into signals having a common format; and
said upward conversion means produces the first and second remapped internal signals by converting upward the common format signals.

8. The transmission unit according to claim 1, wherein said two-way signal conversion means makes the conversions between the first and second network signals which include at least one of:
two-way conversation between high-order group signals belonging to different hierarchical series of signals;
two-way conversions between low-order group signals belonging to different hierarchical series of signals; and
two-way conversions between a high-order group signal and a low-order group signal which belong to different hierarchical series of signals.

9. The transmission unit according to claim 1, wherein said two-way signal conversion means makes the conversions between the first and second network signals, based on Administrative Unit (AU) pointer types identified.

10. The transmission unit according to claim 1, wherein said two-way signal conversion means makes the conversions between the first and second network signals, based on a value given in a byte in a frame overhead.

11. The transmission unit according to claim 1, wherein further comprising means for interfacing with a network management console which is used in operations and maintenance of the conversions between the first and second network signals.

12. The transmission unit according to claim 1, comprising a low-order group interface which processes low-order group signals,
wherein said two-way signal conversion means is employed as an integral part of said low-order group interface.

13. A transport system which transmits and receives digital signals over a first and second network systems, comprising:
(a) a first transmission unit comprising:
a first signal interface means for receiving a first network signal and converting the received first network signal into a first internal signal with a fixed bit rate, and for sending out an outgoing first network signal which is converted from a given second remapped internal signal with the same fixed bit rate;
a first downward conversion means receiving the first internal signal and producing a first lower-level signal by converting the first internal signal down to a lower hierarchical level at which the first and second network systems are compatible with each other in terms of logical signal structure, and
a first upward conversion means for producing a first remapped internal signal by converting a given second lower-level signal up to a higher hierarchical level which complies with the first network system;
(b) a second transmission unit comprising:
a second signal interface means for receiving a second network signal and converting the received second network signal into a second internal signal with the fixed bit rate, and for sending out an outgoing second network signal which is converted from the first remapped internal signal;
a second downward conversion means receiving the second internal signal and producing the second lower-level signal by converting the second internal signal down to a lower hierarchical level at which the first and second network systems are compatible with each other in terms of logical signal structure, and
a second upward conversion means for producing the second remapped internal signal by converting the first lower-level signal up to a higher hierarchical level which complies with the second network system;
(c) a looping back means for looping back, at the lower hierarchical level, the first and second lower-level signals from said first and second downward conversion means to said second and first upward conversion means respectively, to cause the lower-level signals deriving from the received first and second network signals to be converted to the first and second remapped internal signals, respectively; and
wherein the conversions between the first and second network signals include at least one of:
two-way conversions between Synchronous Digital Hierarchy(SDH) signals and Synchronous Optical Network(SONET) signals;
two-way conversions between Plesiochronous Digital Hierarchy(PDH) signals; and
two-way conversions between Asynchronous Transfer Mode(ATM) signals.

14. A two-way signal conversion method which converts network signals between a first and second network systems, comprising the steps of:
(a) receiving a first network signal and converting the received first network signal into a first internal signal with a fixed bit rate,
(b) receiving a second network signal converting the received second network signal into a second internal signal with the fixed bit rate,
(c) producing lower-level signals by converting the first and second internal signals down to a lower hierarchical level at which the first and second network system are compatible with each other in terms of logical signal structure;
(d) producing higher-level signals by converting each given lower-level signal up to a higher hierarchical level which complies with the first or second network system;
(e) looping back the lower-level signals produce at said step (d), whereby the lower-level signal resulting from the first internal network signal will be converted into an outgoing signal to the second network system, and the lower-level signal resulting from the second internal network signal will be converted into an outgoing signal to the first network system
wherein the conversions of the network signals include at least one of:

two-way conversions between Synchronous Digital Hierarchy(SDH) signals and Synchronous Optical Network(SONET) signals;

two-way conversions between Plesiochronous Digital Hierarchy(PDH) signals;

and two-way conversions between Asynchronous Transfer Mode(ATM) signals.

15. The two-way signal conversion method according to claim 14, wherein:

said step (c) of producing the lower-level signals comprises terminating overhead information contained in the received first and second network signals during the downward conversion; and said step (d) of producing the higher-level signals comprises inserting overhead information to the outgoing signals during the upward conversion.

16. The two-way signal conversion method according to claim 14, wherein:

said step (c) of producing the lower-level signals comprises locating stuff data contained in the received first and second network signals, and removing the stuff data during the downward conversion; and said step (d) of producing the higher-level signals comprises inserting stuff data to the outgoing signals, considering which part of such signals should be stuffed so as to comply with the first and second network system.

17. The two-way signal conversion method according to claim 14, wherein said step (d) of producing the higher-level signals comprises converting transmission rates of the received first and second network signals.

18. The two-way signal conversion method according to claim 17, wherein the conversion of transmission rates include at least one of:

a conversion from Tributary Unit 11 (TU-11 to TU-12;

a conversion from TU-11 to Virtual Tributaries 2(VT-2);

a conversion from VT-1.5 to TU-12; and a conversion from VT-1.5 to VT-2.

19. The two-way signal conversion method according to claim 14, wherein:

said step (c) of producing the lower-level signals comprises extracting ATM cells from the received first or second network signal during the downward conversion; and said step (d) of producing the higher-level signals comprises inserting the ATM cells to the outgoing signals during the upward conversion.

20. The two-way signal conversion method according to claim 14, wherein:

the received first and second network signals contain Internet Protocal(IP) packets;

said step (c) of producing the lower-level signals comprises converting the first and second incoming network signals into signals having a common format; and said step (d) of producing the higher-level signals comprises converting upward the common format signals.

21. The two-way signal conversion method according to claim 14, wherein the conversion of the network signals including at least one of:

two-way conversion between high-order group signals belonging to different hierarchical series of signals;

two-way conversion between low-order group signals belonging to different hierarchical series of signals; and two-way conversion between a high-order group signal and a low-order group signal which belong to different hierarchical series of signals.

22. The two-way signal conversion method according to claim 14, wherein said step (c) of producing the lower-level signals comprises:

identifying Administrative Unit (AU) pointer types of the first and second internal network signals;

converting the first and second internal network signals, based on the identified AU pointer types.

23. The two-way signal conversion method according to claim 14, wherein said step (c) of producing the lower-level signals comprises:

identifying a value given in a byte in a frame overhead of each first or second internal network signal; and converting the first and second internal network signals, based on the identified byte values.

24. The two-way signal conversion method according to claim 14, further comprising the step of using a network management console for operations and maintenance of the conversion of the network signals.

* * * * *